US007805012B2

(12) United States Patent
Song

(10) Patent No.: US 7,805,012 B2
(45) Date of Patent: Sep. 28, 2010

(54) SYSTEMS, METHODS, AND COMPUTER PROGRAM PRODUCTS FOR IMAGE PROCESSING, SENSOR PROCESSING, AND OTHER SIGNAL PROCESSING USING GENERAL PARAMETRIC FAMILIES OF DISTRIBUTIONS

(75) Inventor: Kai-Sheng Song, Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 890 days.

(21) Appl. No.: 11/677,566

(22) Filed: Feb. 21, 2007

(65) Prior Publication Data

US 2007/0172135 A1 Jul. 26, 2007

Related U.S. Application Data

(63) Continuation-in-part of application No. 11/609,298, filed on Dec. 11, 2006.

(60) Provisional application No. 60/748,967, filed on Dec. 9, 2005, provisional application No. 60/775,396, filed on Feb. 21, 2006.

(51) Int. Cl.
 *G06K 9/36* (2006.01)
(52) U.S. Cl. .................. 382/232; 382/168; 382/154
(58) Field of Classification Search .................. 382/232, 382/168, 154; 702/181, 184, 134; 600/532, 600/529
See application file for complete search history.

(56) References Cited

U.S. PATENT DOCUMENTS

| | | | | |
|---|---|---|---|---|
| 6,511,426 B1* | 1/2003 | Hossack et al. | ............ | 600/437 |
| 6,681,204 B2* | 1/2004 | Matsumoto et al. | ......... | 704/230 |
| 7,630,435 B2* | 12/2009 | Chen et al. | ............ | 375/240.03 |
| 2002/0013703 A1* | 1/2002 | Matsumoto et al. | ......... | 704/234 |
| 2006/0132357 A1* | 6/2006 | Pozgay et al. | ............... | 342/174 |
| 2007/0083114 A1* | 4/2007 | Yang et al. | .................. | 600/437 |

OTHER PUBLICATIONS

Chang et al., "Image Probability Distribution Based on Generalized Gamma Function", IEEE Signal Processing Letters, vol. 12, No. 4, Apr. 2005, pp. 325-328.*
Sola et al., "Ultrasound image coding using shape-adaptive DCT and adaptive quantization", Proc. SPIE, vol. 3031, 328 (1997); doi:10. 1117/12.273911, pp. 328-338.*

(Continued)

*Primary Examiner*—Brian Q Le
*Assistant Examiner*—Mekonen Bekele
(74) *Attorney, Agent, or Firm*—Sutherland Asbill & Brennan LLP

(57) ABSTRACT

Methods and systems are disclosed for signal processing. A method includes receiving a plurality of digitized coefficients determining a best-fit distribution of a general family of distributions for the plurality of digitized coefficients, and providing a characterization of the digitized coefficients based upon the determined best-fit distribution. The system includes a memory for storing computer program instructions and a processor in communication with the memory. The processor is operable to execute the computer program instructions to receive a plurality of digitized coefficients, determine a best-fit distribution of a general family of distributions for the plurality of digitized coefficients, and provide a characterization of the digitized coefficients based upon the determined best-fit distribution.

18 Claims, 14 Drawing Sheets

OTHER PUBLICATIONS

Chang et al., (hereafter Chang), "Image Probability Distribution Based on Generalized Gamma Function", IEEE Signal Processing vol. 12, published Apr. 4, 2005, pp. 325-338.*

Eldon Hansen, "A globally convergent interval method for computing and bounding real roots" vol. 18, No. 4 / Dec. 1978, Springer Netherlands, pp. 415-424.*

P.K. Andersen, "Cox's Regression Model for Counting Processes: A Large Sample Study", The Annals of Statistics, Dec. 1982, pp. 1100-1120, vol. 10, Institute of Mathematical Statistics.

M. Antonini, "Image Coding Using Wavelet Transform", IEEE Transactions on Image Processing, Apr. 1992, pp. 205-220, vol. 1, No. 2.

S. Batalama, "On the Generalized Cramer-Rao Bound for the Estimation of the Location", IEEE Transactions on Signal Processing, Feb. 1997, vol. 45, No. 2.

J. Chang, "Image Probability Distribution Based on Generalized Gamma Function", IEEE Signal Processing Letters, Apr. 2005, pp. 325-328, vol. 12, No. 4.

F. Chen, "Lattice Vector Quantization of Generalized Gaussian Sources", IEEE Transactions on Information Theory, Jan. 1997, pp. 92-103, vol. 43, No. 1.

M. Do, "Wavelet-Based Texture Retrieval Using Generalized Gaussian Density and Kullback-Leibler Distance", IEEE Transactions on Image Processing, Feb. 2002, pp. 146-158, vol. 11, No. 2.

N. Farvardin, "Optimum Quantizer Performance for a Class of Non-Gaussian Memoryless Sources", IEEE Transactions on Information Theory, May 1984, pp. 485-497, vol. IT-30, No. 3.

H. Hager, "Inferential Procedures for the Generalized Gamma Distribution", Journal of the American Statistical Association, Dec. 1970, pp. 1601-1609, vol. 65, No. 332.

P. Huang, "On New Moment Estimation of Parameters of the Generalized Gamma Distribution Using It's Characterization", Taiwanese Journal of Mathematics, pp. 1083-1093, vol. 10, No. 4.

R. Joshi, "Comparison of Generalized Gaussian and Laplacian Modeling in DCT Image Coding", IEEE Signal Processing Letters, May 1995, pp. 81-82, vol. 2, No. 5.

R. Joshi, "Image Subband Coding Using Arithmetic Coded Trellis Coded Quantization", IEEE Transactions on Circuits and Systems for Video Technology, Dec. 1995, pp. 515-523, vol. 5, No. 6.

E. Lam, "A Mathematical Analysis of the DCT Coefficient Distributions for Images", IEEE Transactions on Image Processing, Oct. 2000, pp. 1661-1666, vol. 9, No. 10.

J. Lawless, "Inference in the Generalized Gamma and Log Gamma Distributions", Technometrics, Aug. 1980, pp. 409-418, vol. 22, No. 3, American Statistical Association.

P. Loyer, "Lattice-Codebook Enumeration for Generalized Gaussian Source", IEEE Transactions on Information Theory, Feb. 2003, pp. 521-528, vol. 49, No. 2.

S. Mallat, "A Theory for Multiresolution Signal Decomposition: The Wavelet Representation", IEEE Transactions on Pattern Analysis and Machine Intelligence, Jul. 1989, pp. 674-693, vol. 11, No. 7.

F. Muller, "Distribution Shape of Two-dimensional DCT Coefficient of Natural Images", Electronic Letters, Oct. 28, 1993, pp. 1935-1936, vol. 29, No. 22.

V.B. Parr, "A Method for Discriminating Between Failure Density Functions Used in Reliability Predictions", Technometrics, Feb. 1965, pp. 1-10, vol. 7, No. 1, American Statistical Association.

R.L. Prentice, "A Log Gamma Model and Its Maximum Likelihood Estimation", Biometrika, Dec. 1974, pp. 539-544, vol. 61, No. 3, Biometrika Trust.

R. Reininger, "Distributions of the Two-Dimensional DCT Coefficients for Images", IEEE Transactions on Communications, Jun. 1983, pp. 835-839, vol. COM-31, No. 6, IEEE Communications Society.

K. Sharifi, "Estimation of Shape Parameter for Generalized Gaussian Distribution in Subband Decompositions of Video", IEEE Transactions on Circuits and Systems for Video Technology, Feb. 1995, vol. 5, No. 1.

J. Shin, "Statistical Modeling of Speech Signals Based on Generalized Gamma Distribution", IEEE Signal Processing Letters, Mar. 2005, pp. 258-261, vol. 12, No. 3.

E.W. Stacy, "A Generalization of the Gamma Distribution", The Annals of Mathematical Statistics, Sep. 1962, pp. 1187-1192, vol. 33, No. 3, Institute of Mathematical Statistics.

E.W. Stacy, "Parameter Estimation for a Generalized Gamma Distribution", Technometrics, Aug. 1965, pp. 349-358, vol. 7, No. 3, American Statistical Association.

E.W. Stacy, "Quasimaximum Likelihood Estimators for Two-parameter Gamma Distributions", QML Estimators, Mar. 1973, pp. 115-124, IBM J. Res. Develop.

N. Tanabe, "Subband Image Coding Using Entropy-Coded Quantization Over Noisy Channels", IEEE Journal on Selected Areas in Communications, Jun. 1992, pp. 926-943, vol. 10, No. 5.

M. Varanasi, "Parametric Generalized Gaussian Density Estimation", Journal Acoustical Society of America, Oct. 1989, pp. 1404-1415, vol. 86 (4), Acoustical Society of America.

D. Wingo, "Computing Maximum-Likelihood Parameter Estimates of the Generalized Gamma Distribution by Numerical Root Isolation", IEEE Transactions on Reliability, Dec. 1987, pp. 586-590, vol. R-36, No. 5.

G. Van De Wouwer, "Statistical Texture Characterization from Discreet Wavelet Representation", IEEE Transactions on Image Processing, Apr. 1999, pp. 592-598, vol. 8, No. 4.

K. Birney, "On the Modeling of DCT and Subband Image Data for Compression", IEEE Transactions on Image Processing, Feb. 1995, pp. 186-193, vol. 4, No. 2.

* cited by examiner

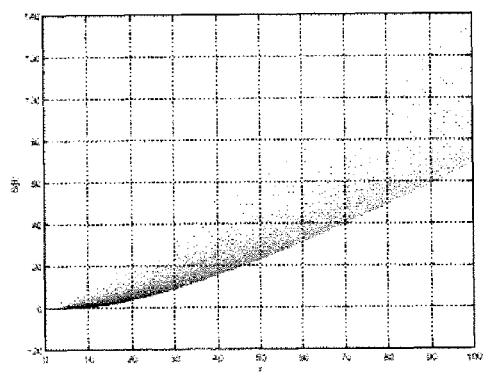
(a)
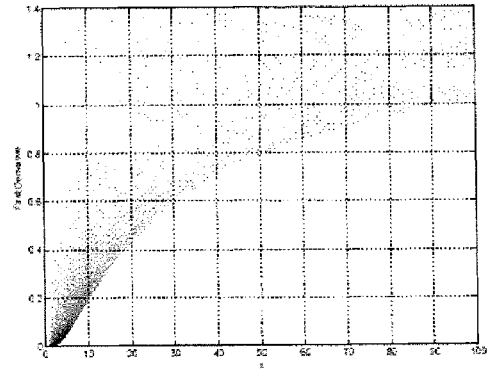
(b)
FIG. 10
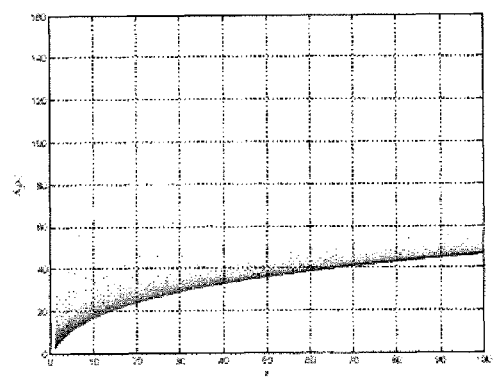
(a)
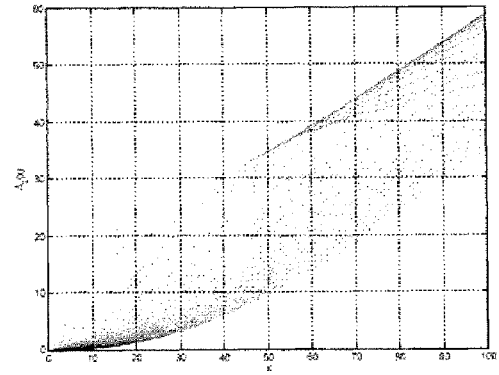
(b)
FIG. 11

ESTIMATES FROM ALGORITHM (16) BASED ON A SINGLE RANDOM SAMPLE OF DIFFERENT SIZES FROM GTD WITH THE SAME $\sigma_0 = 1$ AND VARIOUS VALUES OF SHAPE PARAMETERS $\beta_0$ AND $\lambda_0$

| $n$ | 100 | 150 | 200 | 250 | 300 | $(\beta_0, \lambda_0)$ |
|---|---|---|---|---|---|---|
| $\hat{\beta}_n(\tilde{\beta}_n)$ | 0.3373 (0.3346) | 0.4401 (0.4519) | 0.4485 (0.4453) | 0.4901 (0.5002) | 0.4946 (0.5180) | (0.5, 1.0) |
| $\hat{\lambda}_n(\tilde{\lambda}_n)$ | 1.6985 (1.7227) | 1.1660 (1.1155) | 1.1336 (1.1473) | 0.9600 (0.9287) | 0.9850 (0.9136) | |
| $\hat{\sigma}_n(\tilde{\sigma}_n)$ | 0.1358 (0.1278) | 0.5775 (0.6573) | 0.6018 (0.5810) | 0.9012 (0.9791) | 0.9658 (1.1609) | |
| $\hat{\beta}_n(\tilde{\beta}_n)$ | 0.7291 (0.7182) | 0.8912 (0.8470) | 0.9513 (0.8558) | 1.1035 (1.0167) | 1.1040 (1.0227) | (1.0, 0.5) |
| $\hat{\lambda}_n(\tilde{\lambda}_n)$ | 0.8151 (0.8348) | 0.5870 (0.6338) | 0.5404 (0.6332) | 0.4250 (0.4780) | 0.4390 (0.4902) | |
| $\hat{\sigma}_n(\tilde{\sigma}_n)$ | 0.4953 (0.4762) | 0.7827 (0.7108) | 0.8710 (0.7204) | 1.1564 (1.0352) | 1.1845 (1.0671) | |
| $\hat{\beta}_n(\tilde{\beta}_n)$ | 0.3355 (0.3389) | 0.5170 (0.5660) | 0.4792 (0.5069) | 0.4878 (0.5085) | 0.5060 (0.5275) | (0.5, 2.0) |
| $\hat{\lambda}_n(\tilde{\lambda}_n)$ | 3.9532 (3.8804) | 1.7317 (1.4776) | 2.0562 (1.8595) | 2.0579 (1.9108) | 1.9955 (1.8527) | |
| $\hat{\sigma}_n(\tilde{\sigma}_n)$ | 0.0495 (0.0546) | 1.2937 (1.9671) | 0.7700 (1.0469) | 0.8039 (1.0068) | 0.9767 (1.2117) | |
| $\hat{\beta}_n(\tilde{\beta}_n)$ | 0.6712 (0.6777) | 1.0343 (1.1321) | 0.9595 (1.0138) | 0.9763 (1.0213) | 1.0124 (1.0548) | (1.0, 2.0) |
| $\hat{\lambda}_n(\tilde{\lambda}_n)$ | 3.9532 (3.8804) | 1.7309 (1.4777) | 2.0519 (1.8596) | 2.0549 (1.8962) | 1.9939 (1.8530) | |
| $\hat{\sigma}_n(\tilde{\sigma}_n)$ | 0.2224 (0.2337) | 1.1381 (1.4025) | 0.8804 (1.0231) | 0.8987 (1.0148) | 0.9895 (1.1005) | |

FIG. 13

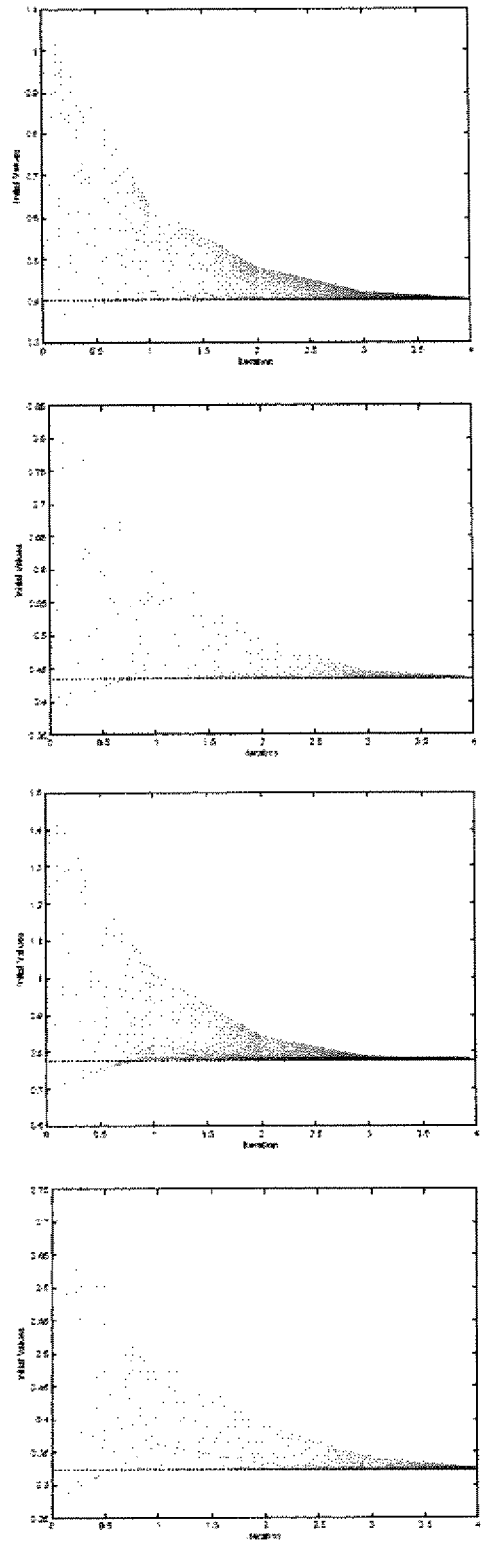
FIG. 14

ESTIMATES FOR VARIOUS DCT COEFFICIENTS AND IMAGES

| Coef | $C_{10}$ | $C_{11}$ | $C_{01}$ | $C_{20}$ | $C_{02}$ | $C_{28}$ | $C_{30}$ | |
|---|---|---|---|---|---|---|---|---|
| $\hat{\beta}_n(\tilde{\beta}_n)$ | 0.39 (0.44) | 0.37 (0.40) | 0.43 (0.47) | 0.31 (0.37) | 0.33 (0.41) | 0.53 (0.63) | 0.58 (0.67) | Elaine |
| $\hat{\lambda}_n(\tilde{\lambda}_n)$ | 4.04 (3.17) | 4.34 (3.77) | 3.44 (3.04) | 6.25 (4.65) | 5.49 (3.67) | 3.01 (2.16) | 2.40 (1.89) | |
| $\hat{s}_n(\tilde{s}_n)$ | 49.37 (47.50) | 25.90 (25.30) | 54.87 (53.76) | 16.75 (16.06) | 19.92 (18.74) | 8.34 (8.01) | 7.72 (7.47) | |
| $\hat{\beta}_n(\tilde{\beta}_n)$ | 0.23 (0.23) | 0.27 (0.26) | 0.40 (0.35) | 0.29 (0.37) | 0.30 (0.32) | 0.27 (0.30) | 0.30 (0.35) | Lenna |
| $\hat{\lambda}_n(\tilde{\lambda}_n)$ | 8.46 (8.51) | 5.56 (5.93) | 2.93 (3.81) | 5.67 (3.68) | 4.89 (4.21) | 7.19 (5.83) | 6.50 (4.80) | |
| $\hat{s}_n(\tilde{s}_n)$ | 53.05 (52.31) | 38.20 (38.96) | 80.65 (85.30) | 18.36 (16.99) | 39.67 (38.54) | 19.20 (18.41) | 9.35 (8.90) | |
| $\hat{\beta}_n(\tilde{\beta}_n)$ | 0.56 (0.54) | 0.43 (0.38) | 0.32 (0.30) | 0.62 (0.47) | 0.26 (0.25) | 0.27 (0.26) | 0.58 (0.46) | Boat |
| $\hat{\lambda}_n(\tilde{\lambda}_n)$ | 1.70 (1.86) | 2.79 (3.64) | 4.33 (4.93) | 1.39 (2.29) | 5.99 (6.42) | 6.39 (6.62) | 1.66 (2.49) | |
| $\hat{s}_n(\tilde{s}_n)$ | 67.29 (68.47) | 33.05 (34.79) | 73.01 (75.07) | 33.74 (37.32) | 51.57 (52.27) | 33.26 (33.55) | 19.51 (21.12) | |
| $\hat{\beta}_n(\tilde{\beta}_n)$ | 0.67 (0.70) | 0.94 (0.96) | 0.78 (0.80) | 0.63 (0.67) | 0.86 (0.82) | 0.91 (0.86) | 0.72 (0.75) | Bridge |
| $\hat{\lambda}_n(\tilde{\lambda}_n)$ | 1.94 (1.80) | 1.14 (1.11) | 1.40 (1.35) | 1.97 (1.77) | 1.11 (1.21) | 1.01 (1.12) | 1.61 (1.51) | |
| $\hat{s}_n(\tilde{s}_n)$ | 72.08 (71.45) | 31.54 (31.45) | 54.76 (54.48) | 46.73 (46.06) | 33.11 (33.48) | 22.38 (22.67) | 30.45 (30.20) | |

FIG. 15

LIKELIHOOD RATIO STATISTICS FOR TESTING GGD VERSUS GΓD

| Coef | $C_{10}$ | $C_{11}$ | $C_{01}$ | $C_{20}$ | $C_{02}$ | $C_{12}$ | $C_{21}$ | $C_{03}$ | $C_{30}$ | |
|---|---|---|---|---|---|---|---|---|---|---|
| $\Lambda_n$ | 50.4658 | 55.2155 | 49.5247 | 102.7064 | 78.7414 | 96.2780 | 89.8797 | 64.0042 | 34.4004 | Elaine |
| $P - value$ | 1.2e-12 | 1.1e-13 | 2.0e-12 | 0 | 0 | 0 | 0 | 1.2e-15 | 4.5e-9 | |
| $\Lambda_n$ | 84.3324 | 40.3561 | 20.5618 | 40.4690 | 26.2920 | 126.0006 | 141.3337 | 85.2905 | 97.7716 | Lenna |
| $P - value$ | 0 | 2.1e-10 | 5.8e-6 | 2.0e-10 | 2.9e-7 | 0 | 0 | 0 | 0 | |
| $\Lambda_n$ | 0.0150 | 25.4718 | 36.8839 | 1.3667 | 44.7271 | 48.2936 | 13.9876 | 60.8014 | 5.7311 | Boat |
| $P - value$ | 0.9024 | 4.5e-7 | 1.3e-9 | 0.2424 | 2.3e-11 | 3.7e-12 | 1.8e-4 | 6.3e-15 | 0.0167 | |
| $\Lambda_n$ | 31.6918 | 3.1987 | 3.6338 | 16.8932 | 0.0348 | 0.2525 | 0.4611 | 1.0141 | 10.1556 | Bridge |
| $P - value$ | 1.8e-8 | 0.0737 | 0.0566 | 4.0e-5 | 0.8521 | 0.6153 | 0.4971 | 0.3139 | 0.0014 | |

FIG. 16

SYSTEMS, METHODS, AND COMPUTER PROGRAM PRODUCTS FOR IMAGE PROCESSING, SENSOR PROCESSING, AND OTHER SIGNAL PROCESSING USING GENERAL PARAMETRIC FAMILIES OF DISTRIBUTIONS

RELATED APPLICATIONS

The invention is a continuation-in-part of U.S. application Ser. No. 11/609,298, filed Dec. 11, 2006, and entitled "Systems, Methods, and Computer Program Products for Compression, Digital Watermarking, and Other Digital Signal Processing for Audio and/or Video Applications," which is a non-provisional application of U.S. Provisional Application Ser. No. 60/748,967, filed Dec. 9, 2005, and entitled "Systems, Methods, and Computer Program Products for Determining Parameters of a Generalized Gaussian Distribution." The invention also claims the benefit of U.S. Provisional Application Ser. No. 60/775,396, filed Feb. 21, 2006, and entitled "Systems, Methods, and Computer Program Products for Determining Parameters for General Parametric Families of Distributions." All of the foregoing applications are hereby incorporated by reference in their entirety as if fully set forth herein.

FIELD OF THE INVENTION

Aspects of an embodiment of the invention relate generally to signal processing, and more particularly, to computationally inexpensive and globally-convergent systems and methods for characterizing image data, sensor data, and other data using parameters of general parametric families of distributions.

BACKGROUND OF THE INVENTION

Many wireless applications, including wireless sensor applications, are limited in processing speed, storage capacity, and communication bandwidth. Furthermore, because many wireless sensor applications are battery powered, their lifetime is determined by their ability to conserve power. Similarly, other applications such as real-time image and video processing applications suffer from similar limitations as the above-described wireless applications. In particular, real-time image and video processing is generally computationally expensive because a large amount of image and video data must be characterized in essentially real-time. Accordingly, there is a need in the industry for automatic, computationally inexpensive, and/or low-power methods for characterizing a variety of data, including sensor data, image data, and video data.

SUMMARY OF THE INVENTION

According to an embodiment of the invention, there is a computer-implemented method of signal processing. The method includes receiving a plurality of digitized coefficients, determining a best-fit distribution of a general family of distributions for the plurality of digitized coefficients, and providing a characterization of the digitized coefficients based upon the determined best-fit distribution.

According to another embodiment of the invention, there is a memory for storing computer program instructions and a processor in communication with the memory. The processor is operable to execute the computer program instructions to receive a plurality of digitized coefficients, determine a best-fit distribution of a general family of distributions for the plurality of digitized coefficients, and provide a characterization of the digitized coefficients based upon the determined best-fit distribution.

According to still another embodiment of the invention, there is a system for signal processing. The system includes means for receiving a plurality of digitized coefficients, means for determining a best-fit distribution of a general family of distributions for the plurality of digitized coefficients, and means for providing a characterization of the digitized coefficients based upon the determined best-fit distribution.

BRIEF DESCRIPTION OF THE SEVERAL VIEWS OF THE DRAWING(S)

Having thus described the invention in general terms, reference will now be made to the accompanying drawings, which are not necessarily draw to scale, and wherein:

FIG. 10 illustrates exemplary plots of $S(\beta)$ and $S(\beta)\beta_0$ as functions of x over the interval [1, 100] for various values of $\lambda_0$ ranging from 0.1 to 50 are given in (a) and (b), respectively, according to an embodiment of the invention.

FIG. 11 illustrates exemplary plots of $\Delta_2(x)$ versus x over the interval [1, 100] for a sequence of $\lambda_0$ from 0.1 to 1 and from 1 to 50 are shown in (a) and (b), respectively, according to an exemplary embodiment of the invention.

FIG. 13 illustrates a table of estimates from algorithm (14) based on a single random sample of different sizes from the generalized gamma distribution with the same $\sigma_0=1$ and various values of shape parameters $\beta_0$ and $\lambda_0$.

FIG. 14 illustrates exemplary images of Lenna, Elaine, Bridge, and Fishing Boat on the left panel and their respective trajectories of the shape estimates for $C_{01}$ in the right panel.

FIG. 15 illustrates a table of exemplary estimates for various DCT coefficients and images, according to an exemplary embodiment of the invention.

FIG. 16 illustrates a comparison table for the likelihood ratio statistics for testing the GGD versus the generalized gamma distribution, according to an exemplary embodiment of the invention.

DETAILED DESCRIPTION OF THE INVENTION

Figure 1:
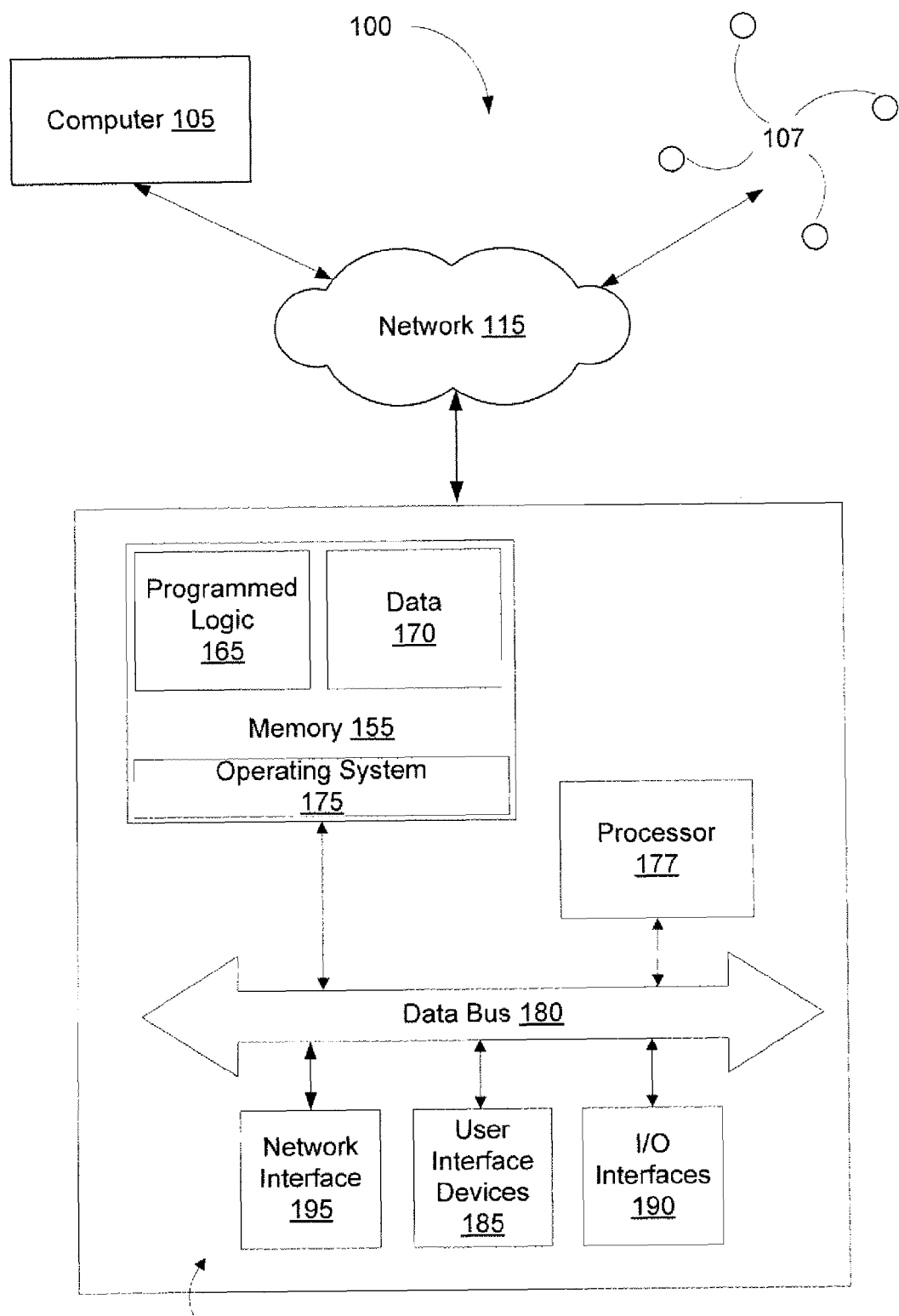
FIG. 1 is an overview of a signal processing system, according to an embodiment of the invention.

Embodiments of the invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Embodiments of the invention are described below with reference to block diagrams of systems, methods, apparatuses and computer program products according to an embodiment of the invention. It will be understood that each block of the block diagrams, and combinations of blocks in the block diagrams, respectively, can be implemented by computer program instructions. These computer program instructions may be loaded onto a general purpose computer, special purpose computer, or other programmable data processing apparatus to produce a machine, such that the combination of computing hardware and instructions which execute thereon constitute means for implementing the functionality of each block of the block diagrams, or combinations of blocks in the block diagrams discussed in detail in the descriptions below.

These computer program instructions may also be stored in a computer-readable memory to constitute an article of manufacture. The article of manufacture may be used in conjunction with a computing device to cause the instructions from the article of manufacture to be loaded onto and executed by the computing device, and thereby implement the function specified in the block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

Accordingly, blocks of the block diagrams support combinations of means for performing the specified functions, combinations of steps for performing the specified functions and program instruction means for performing the specified functions. It will also be understood that each block of the block diagrams, and combinations of blocks in the block diagrams, can be implemented by general or special purpose hardware-based computer systems that perform the specified functions or steps, or combinations of general or special purpose hardware and computer instructions.

Embodiments of the invention may be implemented through one or more application programs running one or more computers. Embodiments of the invention may also be practiced with diverse computer system configurations, including hand-held devices, multiprocessor systems, microprocessor based or programmable consumer electronics, mini-computers and MEMS (micro-electro-mechanical system) sensors, mainframe computers, and the like.

Application programs that are components of the invention may include modules, objects, data structures, etc., that perform certain tasks or implement certain abstract data types. A particular application program (in whole or in part) may reside in a single or multiple memories. Likewise, a particular application program (in whole or in part) may execute on a single or multiple computers or computer processors, Exemplary embodiments of the invention will hereinafter be described with reference to the figures, in which like numerals indicate like elements throughout the several drawings.

Embodiments of the invention may provide for systems, methods, and computer program products that may provide signal processing for a variety of signal-processing applications. For example, these signal-processing processing applications may include compression applications, sensor applications, and ultrasound applications, as described herein. As used herein, the term "general parametric families of distributions" may include a variety of parametric families of distributions where the probability density function of the distribution is indexed by a finite-dimensional vector parameter. According to an embodiment of the invention, the general parametric family of distributions may include a three-parameter generalized gamma distribution. It will be appreciated that the generalized gamma distribution includes the one-sided generalized Gaussian distribution as a special case, which is discussed within U.S. application Ser. No. 11/609,298, filed Dec. 11, 2006, and entitled "Systems, Methods, and Computer Program Products for Compression, Digital Watermarking, and Other Digital Signal Processing for Audio and/or Video Applications," which is a non-provisional application of U.S. Provisional Application Ser. No. 60/748,967, filed Dec. 9, 2005, and entitled "Systems, Methods, and Computer Program Products for Determining Parameters of a Generalized Gaussian Distribution." While the discussions below will be directed to the generalized gamma distribution, it will be appreciated that the general parametric families of distributions may also include a two-parameter Student's t distribution with unknown scale and degree of freedom (e.g., shape), a stable distribution. and a K distribution.

I. System Overview

FIG. 1 is an illustrative system overview of a signal processing system 100 in accordance with an embodiment of the invention. As illustrated in FIG. 1, there is a control unit 110 which may include a memory 155 that stores programmed logic 165 (e.g., software) in accordance with an embodiment of the invention. The programmed logic 165 may include one or more modules for executing one or more of compression/decompression processing (e.g., image/video/audio compression, etc.), sensor processing, ultrasound analysis, and other signal processing methodologies, or combinations thereof, in accordance with embodiments of the invention. The memory 155 may include data 170 that may be utilized in the operation of an embodiment of the invention and an operating system 175. The data 170 may also store unprocessed data, semi-processed data, and processed data, and includes parameters associated with one or more of the signal processing methods described herein. A processor 177 may utilize the operating system 175 to execute the programmed logic 165, and in doing so, may also utilize, perhaps store, modify, and/or retrieve, the data 170.

A data bus 180 may provide communication between the memory 155 and the processor 177. Users may interface with the control unit 110 via a user interface device(s) 185 such as a keyboard, mouse, control panel, display, microphone, speaker, or any other devices capable of communicating information to or from the control unit 110. The control unit 110 may be in communication with other external devices via I/O Interface(s) 190. Additionally, the control unit 110 may include a network interface 195 for communication with the network 115, including one or more computers 105 or one or more sensor modules 107. The network 115 may include a variety of wired and wireless networks, both private and public, including the Internet, a local area network, a metro area network, a wide area network, a public switched telephone network, or any combination thereof. The network 115 may also be an ad-hoc network according to an exemplary embodiment of the invention.

Further the control unit 110 and the programmed logic 165 implemented thereby may comprise software, hardware, firmware or any combination thereof. The control unit 110 may be a personal computer, mainframe computer, minicomputer, any other computer device, or any combination thereof without departing from embodiments of the invention. The control unit 110 may receive data from one or more data sources, perhaps via network 115, for processing in accordance with embodiments of the invention. For example, these data sources may include audio/video/image devices (not shown), ultrasound devices (not shown), sensor modules 107, and other computing devices. Other data sources may be utilized without departing from embodiments of the invention. Similarly, the control unit 110 may also provide data processed in accordance with embodiments of the invention to one or more computers 105, perhaps over the network 115.

II. Operational Overview

In accordance with embodiments of the invention, a general parametric family of distributions may be applicable to a variety of signal-processing applications, including, but not limited to, real-time or near-real-time signal processing associated with compression/decompression, sensors, ultrasound and the like. It will be appreciated that other signal processing applications may similarly be available without departing from embodiments of the invention.

Generally, the parameters of a general parametric family of distributions may be utilized to model, characterize, or summarize distributions of digitized coefficients obtained from source signals, which may be associated with images/video/audio, sensors, ultrasound, a combination thereof, and the like. According to one aspect of the invention, these digitized coefficients may be obtained from by applying a transform to the source signal, where the transform may be a Fast Fourier Transform (FFT), a Wavelet Transform (WT), or a Discrete Cosine Transform (DCT) According to another aspect of the invention, the digitized coefficients may be obtained via methods other than transforms. For example, the digitized coefficients may be obtained from direct measurements in a spatial or time domain such as raw image pixel intensity values or sound intensity values. It will be appreciated that these digitized coefficients may also be obtained from a variety of other methods and sources.

Once the digitized coefficients have been obtained, embodiments of the invention may allow for an ultra-fast and globally-convergent method for determining one or more parameters of a selected distribution that accurately models, characterizes, and/or summarizes the digitized coefficients. The selected distribution may comprise one of a plurality of families of distributions, including the three-parameter generalized gamma distribution. However, as described above, these families of distributions may also include a two-parameter Student's t distribution with unknown scale and degree of freedom (e.g., shape), a stable distribution, a generalized Gaussian distribution, and a K distribution.

In accordance with an embodiment of the invention, the parameters of a distribution may be found by applying a scale-invariant shape estimation (SISE) method (also referred to as a "shape estimator algorithm"). For example, for the three-parameter generalized gamma distribution with two shape parameters and one scale parameter, the scale-invariant shape estimation method may allow one of the shape parameters to be determined independently of scale parameter. Furthermore, in the scale-invariant shape estimation method, the second shape parameter may be expressed in terms of the first shape parameter, thereby only requiring a determination of the first shape parameter. The scale-invariant shape estimation method may be predicated on a shift/substitution methodology, as described in U.S. Provisional Application Ser. No. 60/775,396, filed Feb. 21, 2006, and entitled "Systems, Methods, and Computer Program Products for Determining Parameters for General Parametric Families of Distributions." Accordingly, the scale-invariant shape estimation method is guaranteed to be globally-convergent to a root that is indicative of the shape parameter to be determined.

The scale-invariant shape estimation method will now be generally discussed immediately below with respect to the three-parameter generalized double gamma distribution. A more detail discussion regarding the globally convergent nature of such a scale-invariant shape estimation method will be discussed following the illustrative applications below.

One of ordinary skill in the art will recognize that the embodiments described herein for utilizing the three-parameter generalized gamma distribution are for illustrative purposes only, and are not intended to limit the families of distributions that can be utilized with this invention. For example, as discussed above, other families of distributions may be utilized without departing from embodiments of the invention. According to an exemplary embodiment, the families of distributions may generally include at least one scale and shape parameter along with a location parameter. This location parameter is generally centered at zero, although the location can be shifted accordingly without departing from embodiments of the invention.

Now referring to the three-parameter generalized gamma distribution, the distribution has a probability density function as follows:

$$f(x, \theta) = \frac{\beta x^{\beta\lambda-1}}{\sigma^{\beta\lambda}\Gamma(\lambda)} e^{\{-(\frac{x}{\sigma})^\beta\}},$$

where $\theta$ denotes the parameter vector $(\sigma, \beta, \lambda)$; $\sigma>0$ and $\beta>0$ are scale and shape parameters, respectively; $\lambda>0$ is a second shape parameter that is often referred to as the index shape parameter; and $\Gamma$ denotes a gamma function. The scale (e.g., $\sigma$) and two shape (e.g., $\beta, \lambda$) parameters may be collectively referred to as parameters of the generalized gamma distribution. According to another embodiment of the invention, the imaging processing may utilize a variation of the generalized gamma distribution known as the generalized double gamma distribution, which may be provided by $f_s(x; \theta) := f(|x|;\theta)/2$.

In accordance with an embodiment of the invention, the three parameters (first shape parameter $\beta$, second shape parameter $\lambda$, and scale parameter $\sigma$) of the generalized gamma distribution may be utilized for digital signal processing, including compression/decompression (e.g., image/video/audio compression/decompression), sensor processing, ultrasound processing, and a variety of other digital signal processing applications. Because there are three parameters in the generalized gamma distribution, it can sometimes be more accurate than two-parameter distributions in characterizing signals of these signal processing applications.

However, in order to apply the generalized gamma distribution to the digitized coefficients, the first shape parameter β, second shape parameter λ, and scale parameter σ must be determined accurately. In accordance with an embodiment of the invention, the first shape parameter β (and thus second shape parameter λ and the scale parameter σ, which can be expressed in terms of the first shape parameter β) of the generalized gamma distribution may be estimated with very high accuracy using a very computationally efficient and globally convergent method as described herein. More specifically, in accordance an embodiment of the invention, an estimated first shape parameter β is provided by the global root of the following shape estimator equation:

$$S_n(\beta) := \log(M_n(2\beta)) - 2\log(M_n(\beta)) - \log(1 + \beta(\dot{R}_n(\beta) - \dot{R}_n(0))) = 0,$$

where $$M_n : t \mapsto \frac{1}{n} \sum_{i=1}^{n} |X_i|^t; X_1 \ldots X_n$$

represent the digitized coefficients; and $$R_n := \frac{\dot{M}_n}{M_n},$$

where $\dot{M}_n$ denotes the derivative of $M_n$ with respect to t.

It will be appreciated that the shape estimator equation above may also be provided in other equivalent forms, perhaps without logarithmic transformations as follows:

$$T_n(\beta) := \frac{M_n(2\beta)}{M_n^2(\beta)} - \left(1 + \beta(\dot{R}_n(\beta) - \dot{R}_n(0))\right) = 0$$

Given any starting value for the first shape parameter β, the Newton-Rapson root-finding iteration method may be applied to the estimated shape equation $S_n(\beta)=0$ (or $T_n(\beta)=0$) to estimate the actual value of the first shape parameter β. In accordance with an embodiment of the invention, only two to three iterations of the Newton-Rapson method may be required to converge to the estimator of the true first shape parameter β. In contrast to the other previous shape estimation methods, the Newton-Rapson root-finding iteration method for the above estimated shape equation $S_n(\beta)=0$ (or $T_n(\beta)=0$) will always converge to a unique global root representing the true first shape parameter β. One of ordinary skill in the art will recognize that another method may be utilized instead of the Newton-Rapson method, including Halley's method as known to one of ordinary skill in the art. It will also be appreciated that the fast global convergence of the shape parameter irrespective of a starting value provides an automated and low-power means by which computers 105, sensor modules 107, and control units 110 may characterize signals in accordance with embodiments of the invention.

Once the true first shape parameter β has been determined, the second shape parameter λ, and scale parameter σ can be determined since they are both expressed in terms of the first shape parameter β. In particular, the second shape parameter λ can be expressed as $\lambda = (\beta(\dot{R}_n(\beta) - \dot{R}_n(0)))^{-1}$ and the scale parameter σ can be expressed as $$\sigma := \left(\frac{M_n(\beta)}{\lambda}\right)^{\frac{1}{\beta}}.$$

III. Illustrative Applications

1. Audio/Video/Image Compression and Decompression

In accordance with an embodiment of the invention, the above-described method may be utilized for signal compression. More specifically, the determined parameters of the distribution (e.g., generalized gamma distribution) may be utilized to summarily characterize the distribution of the digitized coefficients. Further, because the parameters of the distribution can be determined in an ultra-fast manner as described above, the methods are also suitable for real-time applications, where data loss and timing remains a concern, including Internet streaming audio/video and voice over IP (VOIP). For example, the method in accordance with an embodiment of the invention may be utilized for data compression/decompression for video, image, and/or audio signals such as codecs for Internet video conferencing and Internet movies delivery, and digital online video digital watermarking. Moreover, the computationally-efficient method of determining the parameters of the distribution are also suitable for portable devices where battery life is a concern. For instance, the methods described above may be utilized for signal processing associated with sensor modules 107 and other devices such as laptops, cellular telephones, pagers, and radios.

Figure 2:
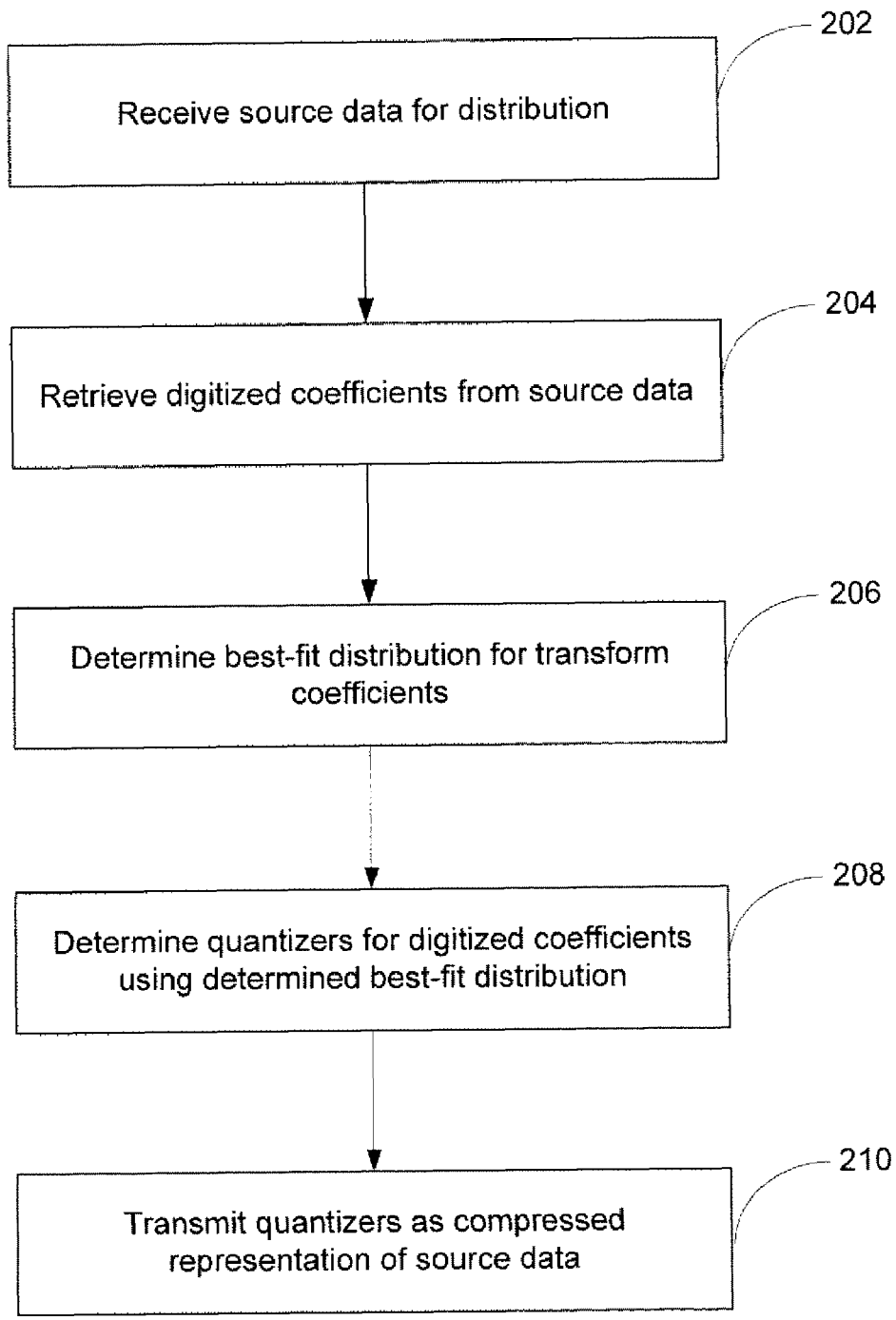
FIG. 2 illustrates an exemplary flow diagram for the compression of source data, according to an exemplary embodiment of the invention.

As block 202 of FIG. 2, a control unit 110 may receive source data for distribution. According to an exemplary embodiment of the present invention, this source data may be in analog form and include audio, video, and a combination thereof and the like. This source data may also be essentially real-time source data. In block 202, the control unit 110 and in particular, the component programmed logic 165, may execute instructions for retrieving digitized coefficients (e.g., transform coefficients) from the source data. These digitized coefficients (e.g., transform coefficients) may utilize frequency transformation coefficients, including discrete cosine transform (DCT) coefficients, according to an embodiment of the present invention. For example, with DCT coefficients, the source data may be transformed from the time domain to the frequency domain. Other transform coefficients may include Fast Fourier transform (FFT) coefficients, Wavelet Transform (WT) coefficients, or Laplace transform coefficients. However, one of ordinary skill in the art will readily recognize that these digitized coefficients may be obtained via methods other than transforms. For example, the digitized coefficients may be obtained from direct measurements in a spatial or time domain such as raw image pixel intensity values or sound intensity values.

The digitized coefficients, which are typically represented by sequences of real numbers, retrieved from the source data of block 204 may essentially form a random distribution, according to an embodiment of the invention. In block 206, a globally convergent method in accordance with an embodiment of the present invention may determine a best-fit distribution from a general family of distributions. The general family of distributions may be a generalized gamma distribution, which was introduced above will be described in further detail below. The best-fit distribution may be determined based upon the parameters (e.g., two shape parameters, scale parameter) determined for the generalized Gamma distribution.

In block 208, the transform coefficients determined in block 204 can be compressed and/or summarized using quantizers in accordance with a quantization algorithm (e.g., Lloyd-Max, uniform scalar dead-zone quantization, generalized uniform scalar dead-zone quantization, trellis coded quantization, vector quantization, entropy constrained scalar quantization (for DWT/DCT quantization tables, etc.)). As described above, transform coefficients may be a real number along a real line. Generally, such a real line may be partitioned using quantizers, where each quantizer represents a portion or range (e.g., quantization step size) of the real line. Accordingly, transform coefficients that fall within a range or portion of the real line may be assigned to the quantizer that represents the respective range or portion. Further, a dead-zone may be indicated on the real line, perhaps from $-\delta$ to $+\delta$, and a simplified quantizer (e.g., null or zero) may be provided for coefficients that fall within the dead-zone. Therefore, the source data may be compressed because each quantizer may be smaller in size than the transform coefficient that it represents. Furthermore, the source data may be compressed because the number of quantizer levels may be less than the number of digitized coefficients.

Still referring to block 208, in accordance with an embodiment of the present invention, a quantization algorithm (Lloyd-Max, uniform scalar dead-zone quantization, generalized uniform scalar dead-zone quantization, trellis coded quantization, etc.) may be based at least in part on a generalized Gamma distribution. In such a case, embodiments of the present invention may provide an efficient and globally convergent method for determining parameters for a generalized Gamma distribution, which may then be utilized by the quantization algorithm for determining the quantizers, the quantization step size, and/or the dead-zone. More specifically, these parameters may include shape and scale parameters for the generalized Gamma distribution associated with the transform coefficients (previously determined in block 206). As shown in block 210, the quantizers determined in block 208 may then be transmitted to one or more of the computers 105 as a compressed representation of the source signal.

Figure 3:
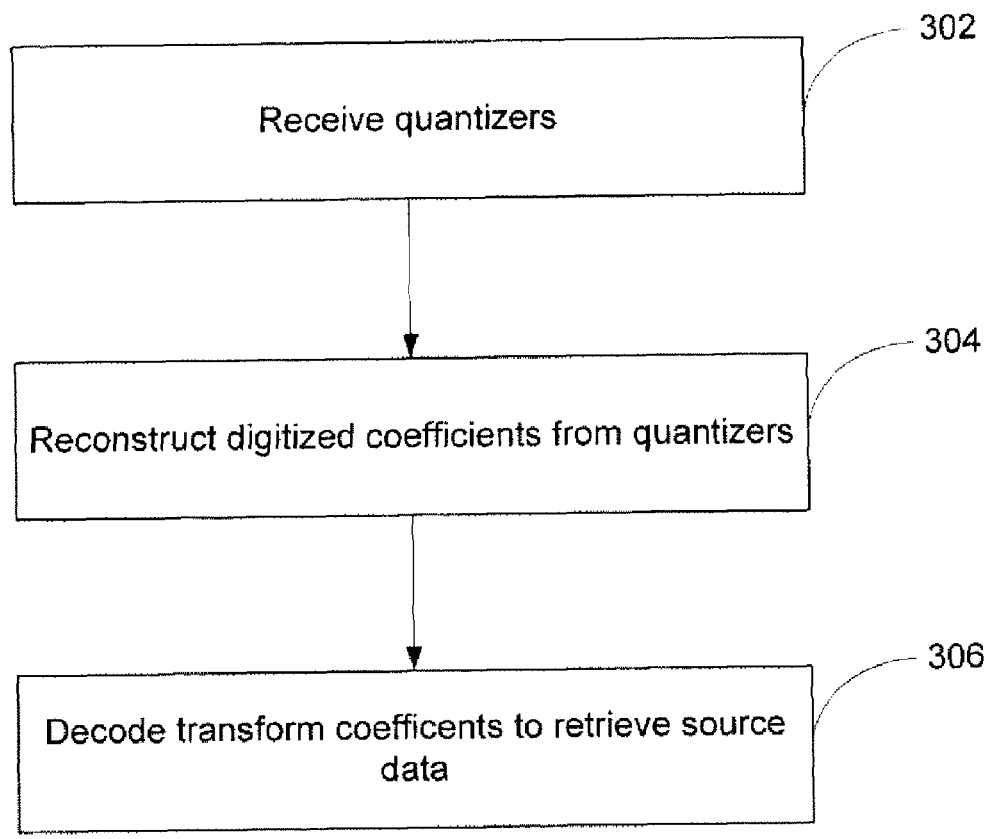
FIG. 3 illustrates an exemplary flow diagram for the decompression of source data, according to an exemplary embodiment of the invention.

FIG. 3 illustrates an exemplary flow diagram for the decompression of the source data, according to an exemplary embodiment of the present invention. In block 302, a computer may receive the quantizers from the control unit 110. In addition to the quantizers, the computer may have also received decompression information, including information associated with the type of quantization methodology utilized and the best-fit distribution (e.g., information associated with the two shape and scale parameters determined for the generalized Gamma distribution) utilized previous in step 208. Likewise, the computer may have also received information regarding the digitization methodology of step 204. In block 304, the computer may reconstruct the digitized coefficients from the received quantizers. Having retrieved or reconstructed the digitized coefficients, the digitized coefficients can then be decoded to obtain the source data, or an approximation thereof (block 306). As an example, DCT coefficients may be transformed from the frequency domain back to the time domain to obtain the source data. Many variations of the compression and decompression methodology described above may be available without departing from embodiments of the present invention.

2. Sensing Modules

Figure 4:
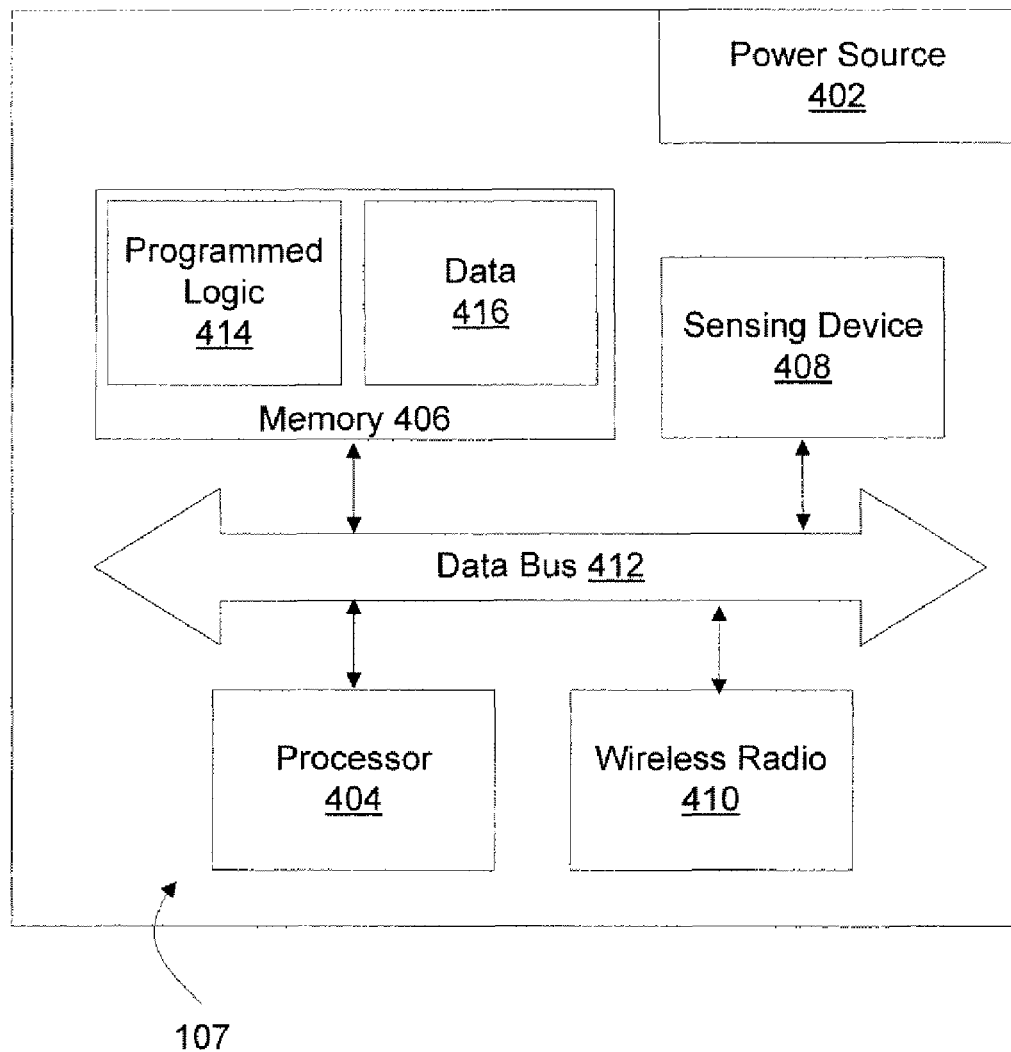
FIG. 4 illustrates an exemplary sensor module, according to an embodiment of the invention.

In accordance with an embodiment of the invention, the above-described method may also be used in conjunction with one or more sensor modules 107, as illustrated in FIG. 4. In particular, FIG. 4 illustrates exemplary components of a sensor module 400, which includes a power source 402, a processor 404, memory 406, a sensing device 408, a wireless radio 410, and a data bus 412. The data bus 412 may allow communications between or among the processor 404, the memory 406, the sensing device 408, and the wireless radio 410. Likewise, although not illustrated, the power source 402 may also receive or provide communications via the data bus 412.

The power source 402 may be from an external power source or an internal power source. Internal power sources include battery power, solar power, fuel cells, magnetically induced power sources, and the like. The processor 404 may be a microprocessor, a central processing unit (CPU), a specialized processor, and the like.

The memory 406 may further include programmed logic 414 to perform methods and one or more blocks of the block diagrams, or combinations of blocks in the block diagrams discussed herein. Likewise, the memory 406 may include data 416, which may include data obtained from or associated with the sensing device 408. In addition, the data 416 may also include parameters of the general family of distributions determined for the data obtained from or associated with the sensing device 408. Further, the data 416 may also include reference or baseline parameters to be utilized in accordance with embodiments of the invention.

The sensing device 408 may include a variety of transducers and MEMs sensors, according to an embodiment of the invention. The sensing device 408 may collect a variety of information, including light, temperature, humidity, vibrations, and other environmental conditions. The wireless radio 410 may be a transceiver or other means for communicating with the control unit 110 via network 115. According to an alternate embodiment of the invention, the sensing module 107 may instead communicate with the control unit 110 using a wired connection. Therefore, each of the sensor modules 107 may be computing devices capable of ascertaining certain conditions and providing associated information back to the control unit 110.

It will be appreciated that the sensing modules 107 may be self-powered (e.g., a battery, etc.) and small, perhaps miniature, in size. Accordingly, multiple sensing modules 107 may be spread over an area of interest to collect sensing data. Further, these sensing modules 107 may communicate with each other and self-organize to form an ad hoc network 115, according to an embodiment of the invention. In particular, because power consumption associated with wireless radio 410 transmissions may be expensive, one sensing module 107 may transmit information over a short distance to a second neighboring sensing module 107, which may then transmit information to another neighboring sensing module 107, and the like, until the information is received by the control unit 110.

Figure 5:
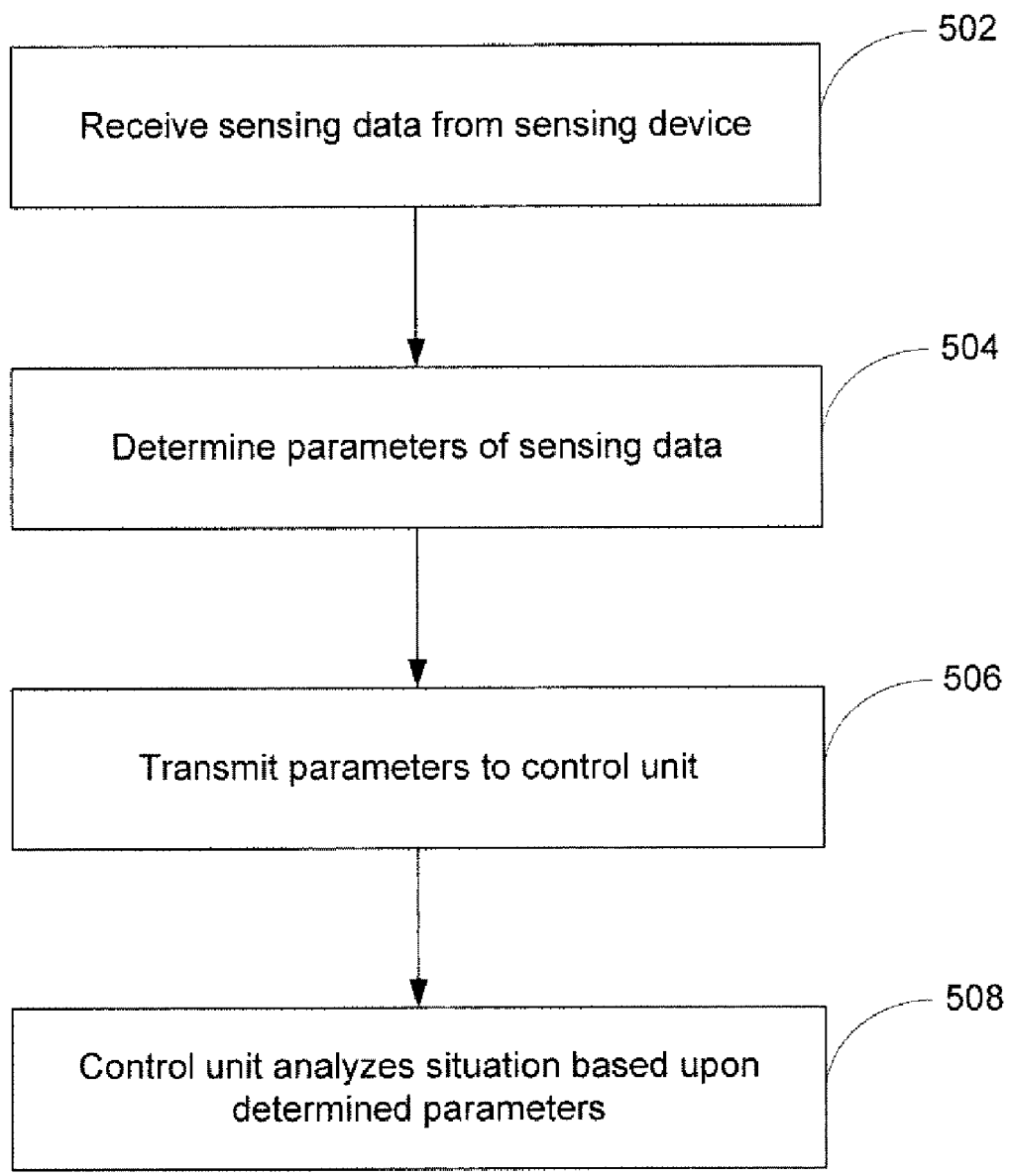
FIGS. 5 and 6 illustrate sensor module processing, according to embodiments of the invention.
Figure 6:
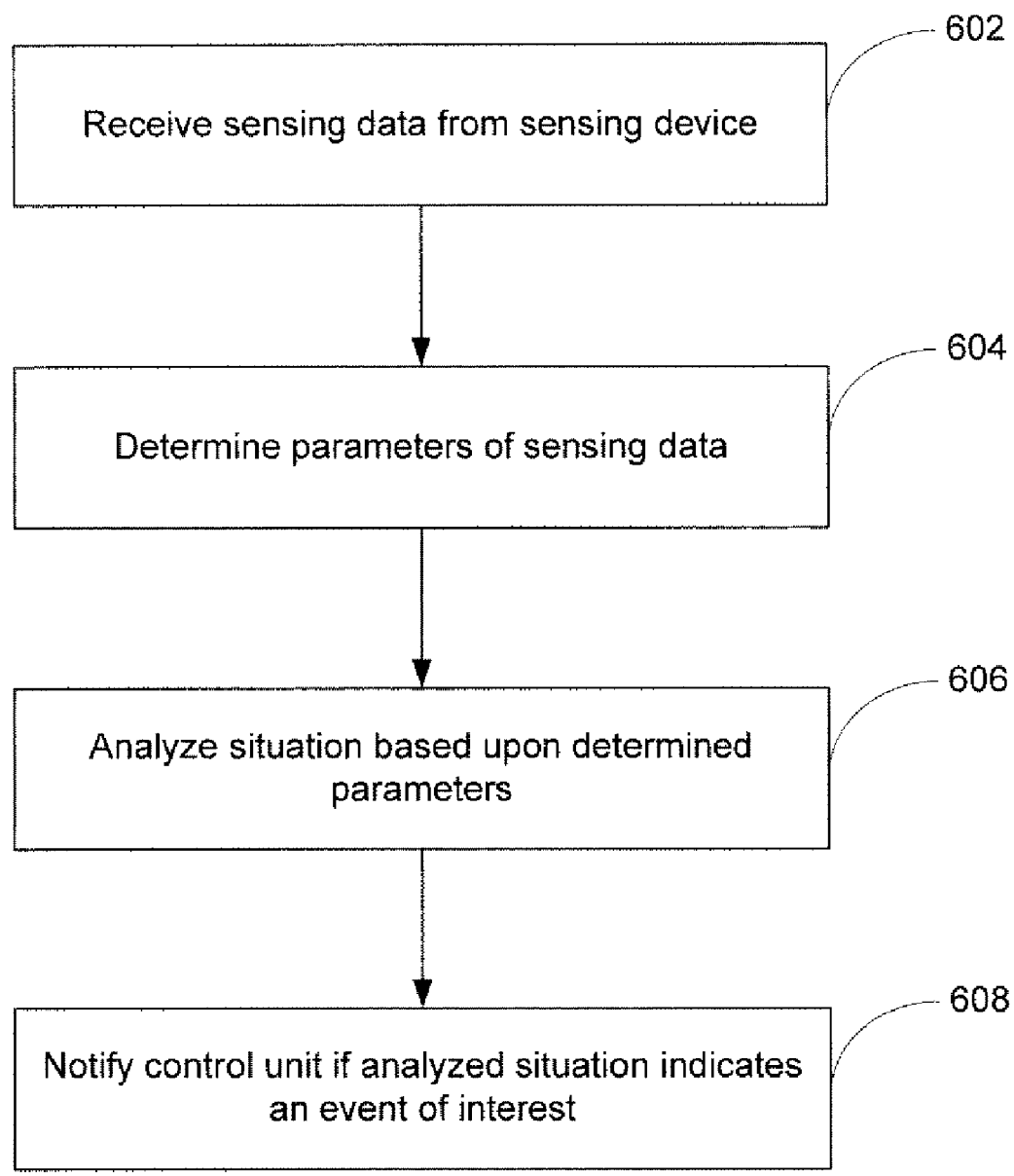

FIGS. 5 and 6 illustrate exemplary embodiments for utilizing the sensor modules 107 to characterize signals according to an embodiment of the invention. In particular, FIG. 5 illustrates an embodiment of the invention where a sensor module 107 may provide the sensing data to the control unit 110 for further processing. By contrast, FIG. 5 illustrates an alternative embodiment of the present invention where a sensor module 107 may perform processing and/or characterization of the sensing data prior to communicating with the control unit 110.

Referring to FIG. 5, at block 502, the sensing modules 107 may receive data from its component sensing device 408. According to an embodiment of the invention, the sensing data may be a continuous stream of data or it may be selected samples of data. The sensing data, which may be associated with environmental data obtained by the sensing device 408, may essentially be a random distribution of data. In block 504, the sensing module 107 may determine parameters of the generalized gamma distribution that specify the best-fit distribution for the sensing data. For example, the sensing module 107 may initially determine a first shape parameter according to a shape-estimator equation described herein. The shape-estimator equation may involve the sensing module 107 performing simple arithmetic operations (e.g., a summation) on coefficients of the sensing data. Once the first shape parameter has been determined, the second shape parameter and the scale parameter can be determined in closed form, since they depend only upon the first shape parameter.

The parameters may be stored in the memory 406, at least temporarily, and transmitted to the control unit 110 (block 506). According to an embodiment of the invention, the sensed data, which may be much larger in size than the associated parameters, may then be discarded to allow more sensed data to be stored and processed. Following block 506, the control unit 110 may then analyze the received parameters to determine whether an event of interest has occurred (block 508). In particular, block 508 may involve the control unit 110 comparing the received parameters to its stored parameters. For example, this comparison may include the control unit 110 determining the probability that an event has or has not occurred based upon the received parameters and the stored parameters. It will be appreciated that the stored parameters associated with the control unit 110 may include parameters associated with events of interest as well as non-events such as noise.

FIG. 6 is similar to FIG. 5, except that the sensing module 107 may determine and process the parameters, and only alerting the control unit 110 if a possible event of interest has occurred. Generally, block 602 is similar to block 502 in that the sensing module 107 may receive sensing data from its component sensing device 408. Likewise, at block 604, the sensing module 107 may determine parameters of the sensed data in a similar manner to block 504 discussed above. In block 606, the parameters are analyzed to determine the likelihood that an event of interest has occurred. According to an embodiment of the invention, block 606 may involve the sensing module 107 comparing the determined parameters with stored parameters. The sensing module 107 may store, in its memory 406, parameters associated with events of interest and non-events, including noise. For example, the comparison may include the sensing module 107 determining the probability that an event has or has not occurred based upon the received parameters and the stored parameters. If the sensing module 107 has determined a high likelihood that an event of interest has occurred, then the sensing module 107 may transmit at least an indication that an event has occurred to the control unit 110. According to an embodiment of the invention, the sensing module 107 may also transmit the associated sensed data and/or parameters as well. By transmitting only selective indications of determined events of interest, the control unit 110 may need to only take action when events of interest have occurred. Likewise, the communications bandwidth between the control unit 110 and the sensing modules 107 may be reduced accordingly.

The events of interest described with respect to FIGS. 5 and 6 will now be discussed in further detail. According to an embodiment of the invention, the events of interest may be environmental dangers, including possible high radiation levels and severe weather. Accordingly, the sensing modules 107 may collect sensing data associated with radiation levels and/or weather conditions (block 502 or 602). The sensing modules 107 will then determine parameters of the best-fit distribution of the generalized gamma distribution, as applied to the sensing data (block 504 or 604). The parameters will then be analyzed by the sensing module 107 (block 606) or the control unit 110 (block 506 and 508) to determine whether an event of interest, perhaps higher radiation levels or certain weather conditions (e.g., possible hurricane, tornado, earthquake, tsunami, etc.) has been determined. It will be appreciated that other events of interest may be utilized, including other dangerous conditions and a person identification, an object identification, or a voice identification. If an event of interest has been determined, perhaps according to sensing data from multiple sensing modules 107, then the control unit 110 can take appropriate action. This action may include warning officials, perhaps in the form of an electronic communications (e.g., e-mail, instant messaging, telephone call, fax, etc.), as to possible radiation danger or possible severe weather.

According to another embodiment of the invention, the sensing modules 107 may be utilized to predict the occurrence of a next event. In particular, the sensing device 408 may sense when a particular event has occurred and the sensing module 107 may record the difference in time between adjacent events. This distribution of times between events may then be the sensing data, as described in blocks 502 and 602 of FIGS. 5 and 6, respectively. Accordingly, the sensing module 107 may then determine parameters of the sensing data (block 504 or 604). The parameters of the sensing data may then be utilized by the sensing module 107 (block 606) or the control unit 110 (blocks 506 and 508) to predict when the next occurrence of the event may occur. Accordingly, based upon the prediction of the next event, the control unit 110 may alert a user or take action itself. For example, in military applications, if the sensing device 408 determines times between detecting the presence of an enemy, a destruction device may be activated at the predicted time for the next presence of the enemy.

3. Ultrasound Application

According to another embodiment of the invention, the above-described methods may also be used in ultrasound applications. Current ultrasound devices have typically had difficulty providing visual representations of ultrasound measurements because the dynamic range of the measurements has been extremely large. These ultrasound devices oftentimes use logarithmic compression or non-linear compression to reduce the dynamic range and magnify weak echoes. This allows both strong and weak echoes to be presented in the same image. However, the image quality is relatively low, and the image oftentimes contains speckles.

Speckles are generally granular, irregular marks, that randomly appear on the ultrasound images and which may obscure small structures such as lesions. However, according to an embodiment of the invention, the generalized gamma distribution can be applied in accordance with embodiments of the invention to determine the best-fit distribution, thereby allowing filtering of the at least a portion of the speckles. According to another embodiment of the invention, however, the distribution of the speckles, as determined by the generalized gamma distribution in accordance with embodiments of the invention, may be indicative of characteristics of the observed tissue. Therefore, such determined distributions may assist in the diagnosis of certain conditions.

It will also be appreciated that other distributions may be utilized instead of the generalized gamma distribution. For example, a K distribution may also be utilized without departing from embodiments of the invention.

IV. Global Convergence of the Shape Estimator Equation

As described above, the probability density function (pdf) of three-parameter generalized gamma distribution is given by $$f(x;\theta) = \frac{\beta x^{\beta\lambda-1}}{\sigma^{\beta\lambda}\Gamma(\lambda)} \exp\left\{-\left(\frac{x}{\sigma}\right)^\beta\right\}, \text{ for } x \in R^+ := (0, \infty), \quad (1)$$

where we use $\theta$ to denote the parameter vector $\theta:=(\sigma, \beta, \lambda)$, $\sigma>0$ and $\beta>0$ are scale and shape parameters, respectively; $\lambda>0$ is a second shape parameter that is often referred to as the index shape parameter; $\Gamma$ denotes the gamma function. It follows from (1) that when $\lambda=1/\beta$, the generalized gamma distribution pdf becomes the pdf of the one-sided generalized Gaussian distribution. In fact this flexible family of distributions covers a much wider spectrum than the generalized Gaussian distribution family encompassing all of the most frequently used parametric distributions such as exponential, Weibull, and gamma distributions as special cases, and log-normal distribution as a limiting case. These distributions may provide useful benchmarking tools for testing and assessing strengths and weaknesses of various algorithms in many practical applications.

As described herein, fast and globally convergent algorithms are disclosed for estimating the three-parameter generalized gamma distribution. A part of the approach is based on the SISE equations developed below in Part A. According to an embodiment of the invention, the sample SISE equations may be completely independent of gamma and polygamma functions. Hence no lookup table and interpolation or additional software are required for real-time implementation and evaluation of these special functions, which is in sharp contrast to existing methods and is quite remarkable in view of the complexity of the generalized gamma distribution model. We establish that the SISE equations have a unique global root in their semi-infinite domains. Furthermore, we show that the probability that the sample SISE equations have a unique global root tends to one as the sample size goes to infinity and this global root is statistically consistent for estimating the true shape parameter. The consistency of the scale estimator and the index shape estimator is also obtained. To numerically determine the root of the sample SISE equations, the Newton-Rapson (NR) algorithm is employed. We establish by fixed-point arguments that, with probability tending to one as the sample size approaches infinity, the NR algorithms converge globally to the unique root from any initial value in its given domain. Given the global convergence of NR algorithms is rare, the aforementioned results may be particularly applicable in real-time signal, image and video processing as well as other applications: by initiating the algorithm with a single starting value, the convergence is automatically guaranteed across all data sets without constantly adapting starting values to different data sets from the same distribution. In addition, the convergence of our algorithms is fast: only about two to four iterations typically yield convergence (with precision $10^{-4}$) even when the initial values are far away from the true parameter value. The fast global convergence of our algorithms for finite samples is numerically demonstrated through both simulation studies and real image analysis. The numerical experiments show that the proposed method has very good finite sample performance and achieves nearly the same accuracy as that of the maximum likelihood (ML) method. Given the generalized Gaussian distribution (GGD) model is a competing model against the generalized gamma distribution model, it may be helpful to test between these two models. Since the GGD model is nested within the generalized gamma distribution model, it is natural to employ the ML ratio procedure for testing the former versus the latter, which requires computing the ML estimators under both GGD and generalized gamma distribution models.

The SISE estimators allow us to initiate the NR algorithm for finding the ML estimators and thus solve the computational problems associated with obtaining the ML estimators under the generalized gamma distribution model. Since the SISE estimates are quite close to the ML estimates, this approach of initiating the NR algorithm with the SISE estimates is computationally practical: only about one-step NR iteration will converge to the ML estimate.

In Part A below, we propose the SISE equations and present our estimation methodology, according to an embodiment of the invention. In Part B, we develop the global theory and convergent algorithms, according to an embodiment of the invention. Several numerical experiments are also included in Part B to demonstrate the finite sample performance of the algorithms. Part C provides the ML ratio procedure for testing the GGD versus the generalized gamma distribution based on several well-known test images. The Appendix contains some further detailed proofs of several theorems in accordance with an embodiment of the invention.

A. Scale-Independent Shape Estimation (SISE) Method

In accordance with an embodiment of the invention, we denote the true value of the parameter vector $\theta$ by $\theta_0:=(\sigma_0, \beta_0, \lambda_0)$. Probability and expectation computed with respect to the true distribution $f(x;\theta_0)$ are denoted by $P_0$ and $E_0$, respectively. By symmetrizing the pdf $f(x;\theta)$, we obtain the three-parameter generalized double gamma distribution with pdf $f_s(x;\theta):=f(|x|;\theta)/2$ which is used in our image analysis. For illustrative purposes, we develop an exemplary method only for the generalized gamma distribution pdf $f(x;\theta)$, but all of our analyses, theorems and equations are exactly the same as those for the symmetrized pdf $f_s(x;\theta)$ provided we replace the random variable X and its samples by their corresponding absolute values. Let the mapping $M_0: R^+ \mapsto R^+$ be defined by $M_0: t \mapsto E_0 X^t$ and its corresponding first derivative with respect to t be defined by $\dot{M}_0$. In addition, we define the mapping $\dot{R}_0:=\dot{M}_0/M_0$ and let $\dot{R}_0(0):=\lim_{t\to 0+}\dot{R}_0(t)$. With these definitions, we propose the following exemplary shape equations:

$$S(\beta) := \log(M_0(2\beta)) - 2\log(M_0(\beta)) - \log\left(1 + \beta\left(\dot{R}_0(\beta) - \dot{R}_0(0)\right)\right) = 0, \quad (2)$$

$$T(\beta) := \frac{M_0(2\beta)}{M_0^2(2\beta)} - \left(1 + \beta\left(\dot{R}_0(\beta) - \dot{R}_0(0)\right)\right) = 0. \quad (3)$$

It is not difficult to see that both $S(\beta)$ and $T(\beta)$ are independent of the scale parameter and they depend on $\beta$, $\beta_0$ and $\lambda_0$ only. For this reason, equations (2) and (3) are called scale-independent shape estimation (SISE) equations. The idea of the proposed method is to consider $S(\beta)$ or $T(\beta)$ as a function of the shape parameter $\beta$ on the positive real line and find a root of equation (2) or (3). It is easy to see that both equations (2) and (3) are mathematically equivalent in that they have the same solutions if any. To establish the existence of a root of equation (2), we evaluate $S(\beta)$ at $\beta=\beta_0$. It follows from direct computations that $$M_0(t) = \frac{\sigma_0^t \Gamma(\lambda_0 + t\beta_0^{-1})}{\Gamma(\lambda_0)}, \qquad (4)$$

$$\dot{M}_0(t) = M_0(t)[\log\sigma_0 + \beta_0^{-1}\psi_0(\lambda_0 + t\beta_0^{-1})].$$

Evaluating $M_0(t)$ and $\dot{M}_0(t)$ at $t=2\beta_0$ and $\beta_0$ leads to $$\log M_0(2\beta_0) - 2\log M_0(\beta_0) = \log\left(1 + \frac{1}{\lambda_0}\right),$$

$$\dot{R}_0(\beta_0) - \dot{R}_0(0) = \beta_0^{-1}(\psi_0(\lambda_0 + 1) - \psi_0(\lambda_0)).$$

Figure 7:
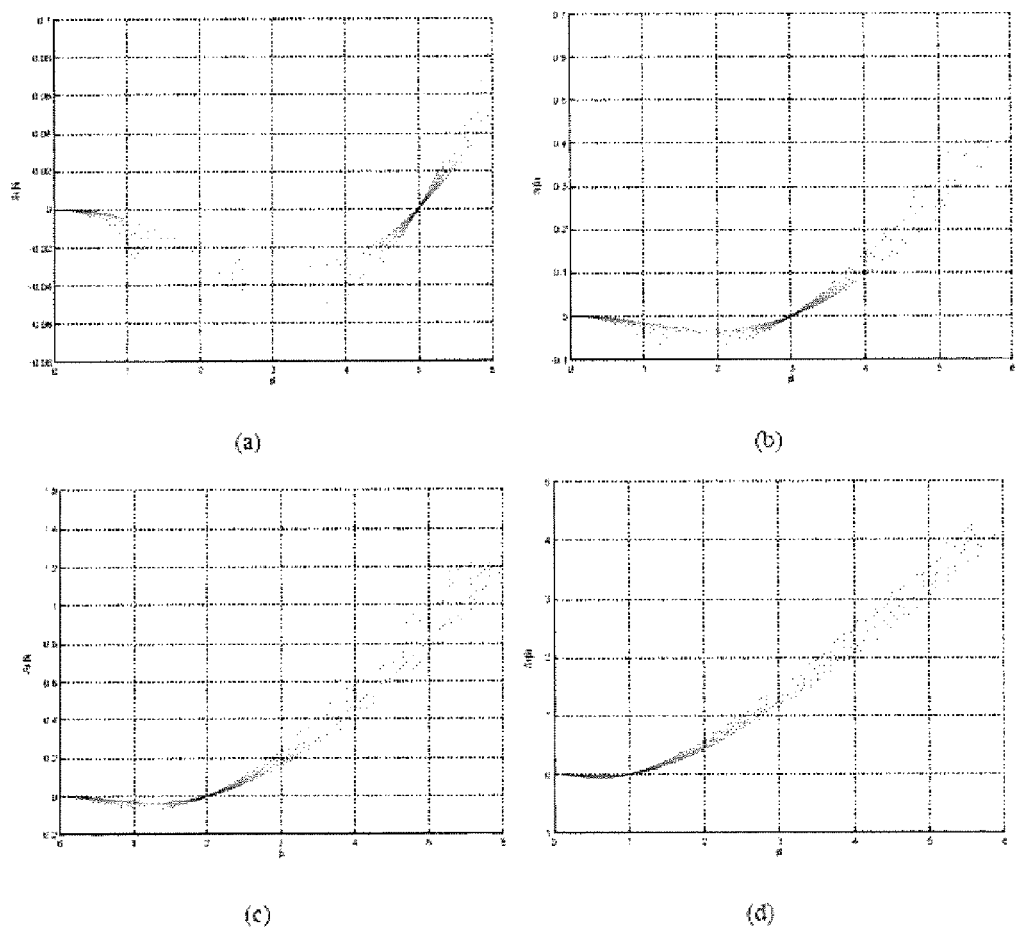
FIG. 7 illustrates exemplary plots of $S(\beta)$ as a function of $\beta$ corresponding to four different values of the true parameter $\beta_0$ and various values of $\lambda_0$ ranging from 0.5 to 1 with a step size of 0.05, where for (a), $\beta_0=5$; for (b). $\beta_0=3$; for (c), $\beta_0=2$; and for (d), $\beta_0=1$, according to an embodiment of the invention.

Using these expressions coupled with the recurrence formula $\psi_0(1+x)=\psi_0(x)+1/x$ for any $x>0$ we verify that indeed $S(\beta_0)=0$. In addition to the existence of a root at $\beta=\beta_0$, FIG. 7 demonstrates that equation (2) has a unique global root. In particular, FIG. 7 illustrates plots of $S(\beta)$ as a function of $\beta$ corresponding to four different values of the true parameter $\beta_0$ and various values of $\lambda_0$ ranging from 0.5 to 1 with a step size of 0.05. (a) $\beta_0=5$; (b) $\beta_0=3$; (c), $\beta_0=2$; (d) $\beta_0=1$. This nice global behavior is quite remarkable in view of the observation that both S and T are highly nonlinear functions.

Since the expectation in $M_0$ is taken with respect to the true parameter value $\beta_0$ which is unknown in practice, we need to estimate the function S or T based on a random sample $\{X_i\}_{i=1}^n$ from $f(x;\theta_0)$. Toward this end, we define the sample mapping $M_n$ as $M_n: t \mapsto \Sigma_{i=1}^n X_i^t/n$. This is simply a sample average for estimating $M_0(t)$, according to an embodiment of the invention. Let $\dot{M}_n$ denote the derivative of $M_n$ with respect to t. We note that $\dot{M}_n(t)=\Sigma_{i=1}^n X_i^t \log(X_i)/n$ which can be seen to be a natural estimator of $\dot{M}_0(t)=E_0X^t\log X$. These natural estimators suggest that we estimate $\dot{R}_0(t)$ and $\dot{R}_0(0)$ by $\dot{R}_n(t):=\dot{M}_n(t)/M_n(t)$ and $\dot{R}_n(0):=\lim_{t\to 0+}\dot{R}_n(t)=\Sigma_{i=1}^n \log(X_i)/n$, respectively. These lead to the sample SISE equations given by $$S_n(\beta) := \qquad (5)$$
$$\log(M_n(2\beta)) - 2\log(M_n(\beta)) - \log(1 + \beta(\dot{R}_n(\beta) - \dot{R}_n(0))) = 0,$$

$$T_n(\beta) := \frac{M_n(2\beta)}{M_n^2(\beta)} - (1 + \beta(\dot{R}_n(\beta) - \dot{R}_n(0))) = 0. \qquad (6)$$

From equations (5) and (6), we see that these sample equations are completely independent of gamma and polygamma functions and involve only elementary mathematical operations such as multiplication, exponentiation and logarithms. This remarkable feature makes the proposed algorithms particularly suitable for both hardware and software implementations in real-time.

To obtain an estimator of $\beta_0$, we solve equation (5) or (6) for a root to be used as the estimator of $\beta_0$. We note that it follows from the law of large numbers (LLN) and the continuous mapping theorem (CMT) that $S_n(\beta)$ and $T_n(\beta)$ are consistent estimators of $S(\beta)$ and $T(\beta)$, respectively, for each $\beta$. Thus intuitively for sufficiently large n, it seems reasonable to expect that equations (5) and (6) are likely to be close to equations (2) and (3), respectively, and hence share those nice properties of equations (2) and (3). This is correct, as illustrated below in Part B.

B. Global Theory and Convergent Algorithms i. SISE Method With Known Index Shape Parameter When the true index shape parameter $\lambda_0$ is known as in the case of Weibull distribution where $\lambda_0=1$ or when the value of the true index shape parameter is specified by users to serve as a tuning parameter, then the three-parameter scale-shape-shape generalized gamma distribution reduces to a two-parameter scale-shape family. Since no estimation of the index shape parameter is needed in these cases, the SISE equations may be simplified:

$$S(\beta) := \log(M_0(2\beta)) - 2\log(M_0(\beta)) - \log\left(1 + \frac{1}{\lambda_0}\right) = 0 \qquad (7)$$

$$T(\beta) := \frac{M_0(2\beta)}{M_0^2(\beta)} - \left(1 + \frac{1}{\lambda_0}\right) = 0. \qquad (8)$$

It will be appreciated that if we replace $\lambda=\lambda_0$ by $\lambda=1/\beta$, then equation (8) reduces to the same shape equation for the GGD model, as illustrated in U.S. application Ser. No. 11/609,298, filed Dec. 11, 2006, and entitled "Systems, Methods, and Computer Program Products for Compression, Digital Watermarking, and Other Digital Signal Processing for Audio and/or Video Applications" (hereinafter referred to sometimes as "Song's shape equation"). The fact that Song's shape equation is a special case of equation (8) is not surprising because the generalized gamma distribution model is simplified to the GGD model when $\lambda=1/\beta$. The same applies to the sample SISE equation. The existence of a unique global root of equations (7) and (8) can be established as follows.

Theorem 1: Both equations (7) and (8) have a unique global root on the positive real line at $\beta_0$.

Proof Since equations (7) and (8) are equivalent, it is enough to provide a proof for equation (7). The fact that $S(\beta_0)=0$ has been verified previously. Differentiating $S(\beta)$ coupled with equation (4) yields for all $\beta>0$ $$\dot{S}(\beta)=2(\dot{R}_0(2\beta)-\dot{R}_0(\beta))=2\beta_0^{-1}(\psi_0(\lambda_0+2\beta\beta_0^{-1})-\psi_0(\lambda_0+\beta\beta_0^{-1})). \qquad (9)$$

Because $\psi_0$ is strictly increasing, we conclude from (9) that $\dot{S}(\beta)>0$ on the positive real line for all $\beta_0>0$ and $\lambda_0>0$. Thus $S(\beta)$ is a strictly increasing function of $\beta$ and $\beta=\beta_0$ is the unique global root of equation (7).

In practice, to estimate $\beta_0$ based on a given random sample $\{X_i\}_{t=1}^n$ from $f(x;\theta_0)$ we solve the following sample SISE equations for a root:

$$S_n(\beta) := \log(M_n(2\beta)) - 2\log(M_n(\beta)) - \log\left(1 + \frac{1}{\lambda_0}\right) = 0 \qquad (10)$$

$$T_n(\beta) = \frac{M_n(2\beta)}{M_n^2(\beta)} - \left(1 + \frac{1}{\lambda_0}\right) = 0 \qquad (11)$$

It turns out that these sample SISE equations behave very well globally throughout the arbitrarily large parameter set $B_L := (0, \beta_L)$, where $\beta_L > \beta_0$ is ay arbitrarily large real number and the resulting root $\hat{\beta}_n$ is a statistically consistent estimator of the true shape parameter $\beta_0$. These results are established in Theorem 2.

Theorem 2: The probability that equations (10) and (11) have a unique global root $\hat{\beta}_n$ on the domain $B_L$ tends to 1 as $n\to\infty$. Furthermore, $$\hat{\beta}_n \xrightarrow{P_0} \beta_0$$

as n→∞.

Proof: Let $$U_n(\beta) = nM_n(2\beta) - n\left(1 + \frac{1}{\lambda_0}\right)M_n(\beta).$$

It will be appreciated that both equations (10) and (11) have the same roots, if any, as equation $U_n(\beta)=0$. By differentiating $U_n(\beta)$, we get $$\dot{U}_n(\beta) = 2n\dot{M}_n(2\beta) - 2n\left(1 + \frac{1}{\lambda_0}\right)M_n(\beta)\dot{M}_n(\beta).$$

For every $\beta>0$, the LLN and CMT imply $$\frac{\dot{U}_n(\beta)}{n} \xrightarrow{P_0} \dot{U}(\beta) := 2\dot{M}_0(2\beta) - 2\left(1 + \frac{1}{\lambda_0}\right)M_0(\beta)\dot{M}_0(\beta) \text{ as } n \to \infty.$$

Evaluating $\dot{U}(\beta)$ at $\beta_0$, we obtain $\dot{U}(\beta_0)=2\lambda_0\sigma_0^{2\beta_0}/\beta_0$. Since $\dot{U}(\beta_0)>0$, we can then define the neighborhood $H_n(\beta_0, r) := \{\beta \in R^+ : |\beta - \beta_0| \leq r/\sqrt{n\dot{U}(\beta_0)}\}$ for real number $r>0$. An argument similar to the one used in [20] shows that $U_n(\beta)=0$ has at least one solution $\hat{\beta}_n \in H_n(\beta_0, r)$ and $$\hat{\beta}_n \xrightarrow{P_0} \beta_0.$$

It follows from the same convexity argument as given for Song's shape equation that $\dot{S}_n(\beta)$ converges in probability to $\dot{S}(\beta)$ uniformly over each compact subset K of $R^+$ as n→∞. In particular, we can take K to be the closure of $B_L$. Since $\dot{S}_n(\beta)>0$ on the positive real line for all $\beta_0>0$ and $\lambda_0>0$, we conclude that, with probability tending to 1, $\dot{S}_n(\beta)>0$ and $S_n(\beta)$ is strictly increasing on $B_L$. Consequently, the root $\hat{\beta}_n$ is the unique global root on $B_L$.

In applications according to embodiments of the invention, both scale and shape parameters are usually estimated. Given the consistent estimator $\hat{\beta}_n$, the estimator for the scale parameter $\sigma_0$ is then obtained by $$\hat{\sigma}_n := \left(\frac{M_n(\hat{\beta}_n)}{\lambda_0}\right)^{1/\hat{\beta}_n}. \tag{12}$$

Corollary 1: $\hat{\sigma}_n$ is a consistent estimator of $\sigma_0$.

Proof: It follows from Theorem 2 and the decomposition $M_n(\hat{\beta}_n) - M_0(\beta_0) = M_n(\hat{\beta}_n) - M_0(\hat{\beta}_n) + M_0(\hat{\beta}_n) - M_0(\beta_0)$ that for sufficiently large n and for some compact set K containing $\beta_0$ $$|M_n(\hat{\beta}_n) - M_0(\beta_0)| \leq \tag{13}$$
$$\sup_{\beta \in K}|M_n(\beta) - M_0(\beta)| + |M_0(\hat{\beta}_n) - M_0(\beta_0)|$$

The same convexity argument as given for Song's shape equation shows that $$\sup_{\beta \in K}|M_n(\beta) - M_0(\beta)| \xrightarrow{P_0} 0.$$

The CMT and Theorem 2 imply that $$|M_0(\hat{\beta}_n) - M_0(\beta_0)| \xrightarrow{P_0} 0.$$

We conclude from algorithm (13) that $$M_n(\hat{\beta}_n) \xrightarrow{P_0} M_0(\beta_0).$$

An application of the CMT coupled with the consistency of $\hat{\beta}_n$ completes the proof, according to an embodiment of the invention.

ii. Fast Globally Convergent Algorithms With Known Index Parameter

As discussed previously, both S and T share the nice global monotonicity on the positive real line. It will be appreciated that S and T possess a global convex shape. This important property makes it possible to develop fast and globally convergent algorithms for finding the solution quickly in any given application regardless of its initial values. Our next two theorems make these statements more precise. There are a number of numerical algorithms that can be used to find the root based on a random sample from $f(x;\theta_0)$. We focus on the NR method due to its fast quadratic convergence property. The NR root-finding algorithms for equations (10) and (11) are given, respectively, as follows:

$$\hat{\beta}_{n,k+1} = \hat{\beta}_{n,k} - \frac{S_n(\hat{\beta}_{n,k})}{\dot{S}_n(\hat{\beta}_{n,k})}, \tag{14}$$

$$\hat{\beta}_{n,k+1} = \hat{\beta}_{n,k} - \frac{T_n(\hat{\beta}_{n,k})}{\dot{T}_n(\hat{\beta}_{n,k})}, \tag{15}$$

for k=1, 2, . . . , where $\hat{\beta}_{n,1}$, 1 denotes the initial value for the iteration and $\dot{S}_n$ and $\dot{T}_n$ denote the derivative of $S_n$ and $T_n$, respectively. First, we establish the convergence of equation (15).

Theorem 3: For all $\beta_0>0$ and $\lambda_0>0$, with probability tending to 1 as n→∞, equation (15) converges to the unique global root $\hat{\beta}_n$ from any initial value $\hat{\beta}_{n,1} \in R^+$. In other words, $$P_0\left(\lim_{k\to\infty} \hat{\beta}_{n,k} = \hat{\beta}_n\right) \to 1 \text{ as } n \to \infty.$$

Proof It follows from differentiating $T(\beta)$ with respect to $\beta$ that $\dot{T}(\beta)=M_0(2\beta)\dot{S}(\beta)/M_0^2(\beta)$. We note that $\dot{T}(\beta)>0$ in view of (9). Evaluating the second derivative of $T(\beta)$ using (9) leads to $$T^{(2)}(\beta) = \frac{2M_0(2\beta)}{\beta_0^2 M_0^2(\beta)}\left\{\begin{array}{l}2[\psi_0(\lambda_0+\beta\beta_0^{-1})-\psi_0(\lambda_0+\beta\beta_0^{-1})]^2 + \\ 2\psi_1(\lambda_0+2\beta\beta_0^{-1})-\psi_1(\lambda_0+\beta\beta_0^{-1})\end{array}\right\},$$

where $\psi_1$ denotes the trigamma function. It follows from the series expansions of digamma and trigamma functions that $2[\psi_0(\lambda_0+2\beta\beta_0^{-1})-\psi_0(\lambda_0+\beta\beta_0^{-1})]^2+2\psi_1(\lambda_0+2\beta\beta_0^{-1})-\psi_1(\lambda_0+\beta\beta_0^{-1})>0$ for all $\beta\in R^+$, all $\beta_0>0$ and $\lambda_0>0$. Hence $T^{(2)}(\beta)>0$. An application of the fixed point argument as given for Song's shape equation to algorithm (15) completes the proof.

Figure 8:
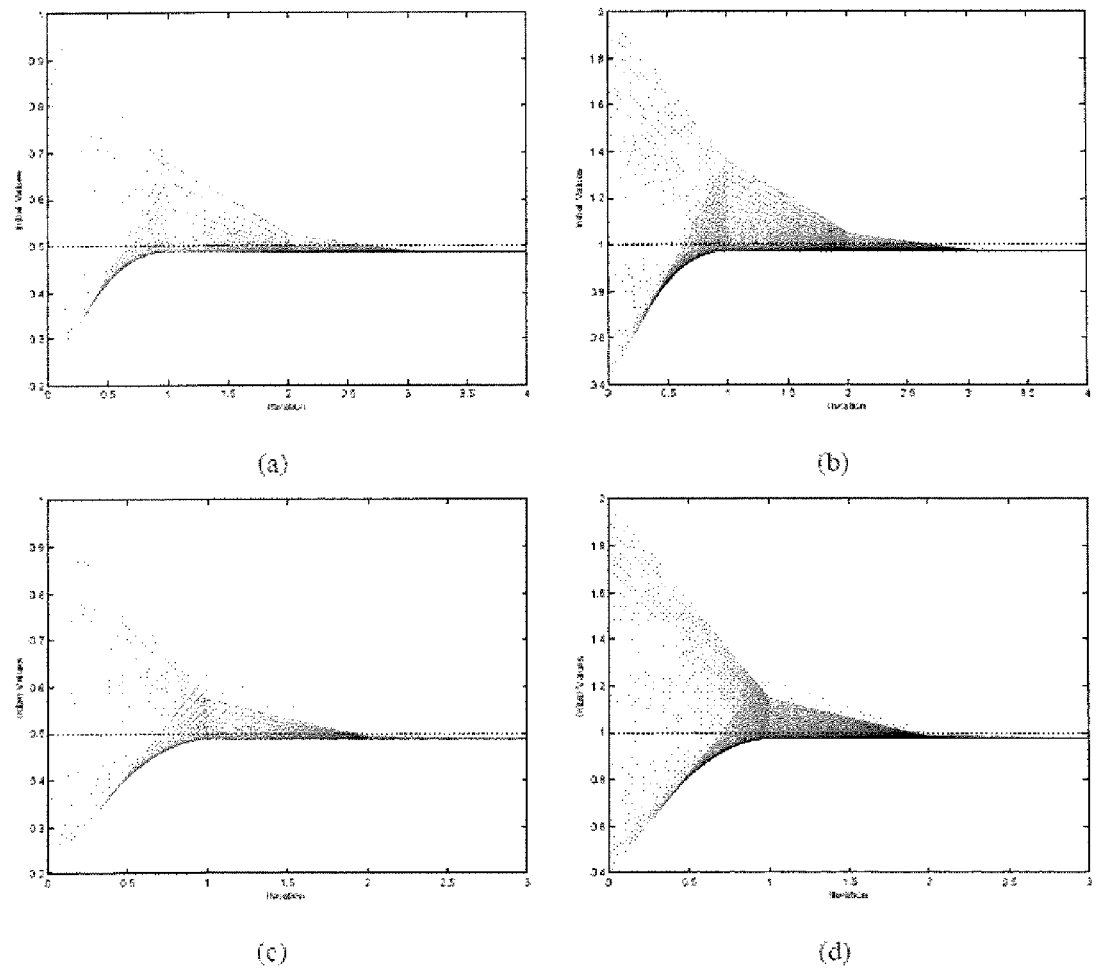
FIG. 8 illustrates an exemplary trajectory of the shape estimates plotted as a function of the iteration number, where for (a), $\beta_0=0.5$; for (b), $\beta_0=1.0$; for (c), $\beta_0=0.5$; and for (d), $\beta_0=1.0$, according to an exemplary embodiment of the invention.

To verify the global convergence of algorithm (15), we conduct some simulations. For each value of the true shape parameter $\beta_0$ as given in FIG. 8, a single random sample of size 200 is generated from the generalized gamma distribution with $\sigma_0=1$ and $\lambda_0=3$. For various initial values, we apply iteration (15) to the aforementioned random sample and obtain successive shape estimates. There is plotted, in panel (a) and (b) of FIG. 8, the trajectory (solid lines) of the shape estimates $\hat{\beta}_{n,k}$ as a function of the iteration number k. As can be seen from FIG. 8, all of the iterations in each panel converge regardless of starting values and they all converge to their respective roots $\hat{\beta}_n=0.4869, 0.9739$ corresponding to the true values $\beta_0=0.5, 1.0$ (dotted lines) ((a) $\beta_0=0.5$; (b) $\beta_0=1.0$; (c) $\beta_0=0.5$; (d), $\beta_0=1.0$). The global convergence is achieved in three to four iterations. Next, we establish the convergence of algorithm (14).

Theorem 4: With probability tending to 1 as n→∞, algorithm (14) converges to the unique global root $\hat{\beta}_n$ from any initial value $\hat{\beta}_{n,1}\in R^+$ for all $\beta_0>0$ and $\lambda_0\geq 1$. In other words, $$P_0\left(\lim_{k\to\infty} \hat{\beta}_{n,k} = \hat{\beta}_n\right) \to 1 \text{ as } n \to \infty.$$

Proof: The key argument is to establish the strict convexity of S. From (9), simple algebra shows that $S^{(2)}(\beta)=2\beta_0^{-2}[2\psi_1(\lambda_0+2\beta\beta_0^{-1})-\psi_1(\lambda_0+\beta\beta_0^{-1})]$. We employ the following trigamma inequalities valid for any x>0

$$\frac{1}{x}+\frac{1}{2x^2}+\frac{1}{6x^3}-\frac{1}{30x^5} < \psi_1(x) < \frac{1}{x}+\frac{1}{2x^2}+\frac{1}{6x^3}. \quad (16)$$

Let $x:=\beta\beta_0^{-1}$. Then it follows from inequality (16) that $$2\psi_1(\lambda_0+2x)-\psi_1(\lambda_0+x) > \frac{\lambda_0}{(\lambda_0+2x)(\lambda_0+x)}-\frac{1}{2(\lambda_0+x)^2}+$$
$$\frac{1}{(\lambda_0+2x)^2}-\frac{1}{6(\lambda_0+x)^3}+\frac{1}{3(\lambda_0+2x)^3}-\frac{1}{15(\lambda_0+2x)^5}.$$

Since $1/(3(\lambda_0+2x)^3)-1/(15(\lambda_0+2x)^5)>0$ and for any x>0 and for all $\lambda_0\geq 1$ we conclude that $$2\psi_1(\lambda_0+2x)-\psi_1(\lambda_0+x) >$$
$$\frac{\lambda_0}{(\lambda_0+2x)(\lambda_0+x)}\left\{1-\frac{\lambda_0+2x}{2\lambda_0(\lambda_0+x)}+\frac{\lambda_0+x}{\lambda_0(\lambda_0+2x)}-\frac{\lambda_0+2x}{6\lambda_0(\lambda_0+x)^2}\right\}.$$

The proof of $S^{(2)}(\beta)>0$ is complete by noting that for any x>0 and all $\lambda_0\geq 1$, $$1-\frac{(\lambda_0+2x)}{2\lambda_0(\lambda_0+x)} = \frac{2\lambda_0^2-\lambda_0+2x(\lambda_0-1)}{2\lambda_0(\lambda_0+x)} > 0 \text{ and}$$

$$\frac{\lambda_0+x}{\lambda_0(\lambda_0+2x)}-\frac{\lambda_0+2x}{6\lambda_0(\lambda_0+x)^2} =$$
$$\frac{\lambda_0^2(6\lambda_0-1)+(18\lambda_0^2-4\lambda_0)x+(18\lambda_0-4)x^2+6x^3}{6\lambda_0(\lambda_0+2x)(\lambda_0+x)^2} > 0.$$

An application of the fixed point argument as described with respect to Song's shape equation to algorithm (14) completes the proof.

To compare algorithm (14) with (15), we repeat the same numerical experiment as described previously for (15). Specifically, we apply algorithm (14) to the same random samples as generated in (a) and (b) and plot the trajectory of the shape estimates $\hat{\beta}_{n,k}$ as a function of the iteration number k in panel (c) and (d) of FIG. 8. As can be seen from FIG. 8, all of the iterations in each panel converge regardless of their initial values and as expected they all converge to the same roots as given in (a) and (b). Although both algorithms show similar performance, algorithm (14) is seen to be faster than equation (15): the global convergence is achieved in only two to three iterations.

Figure 9:
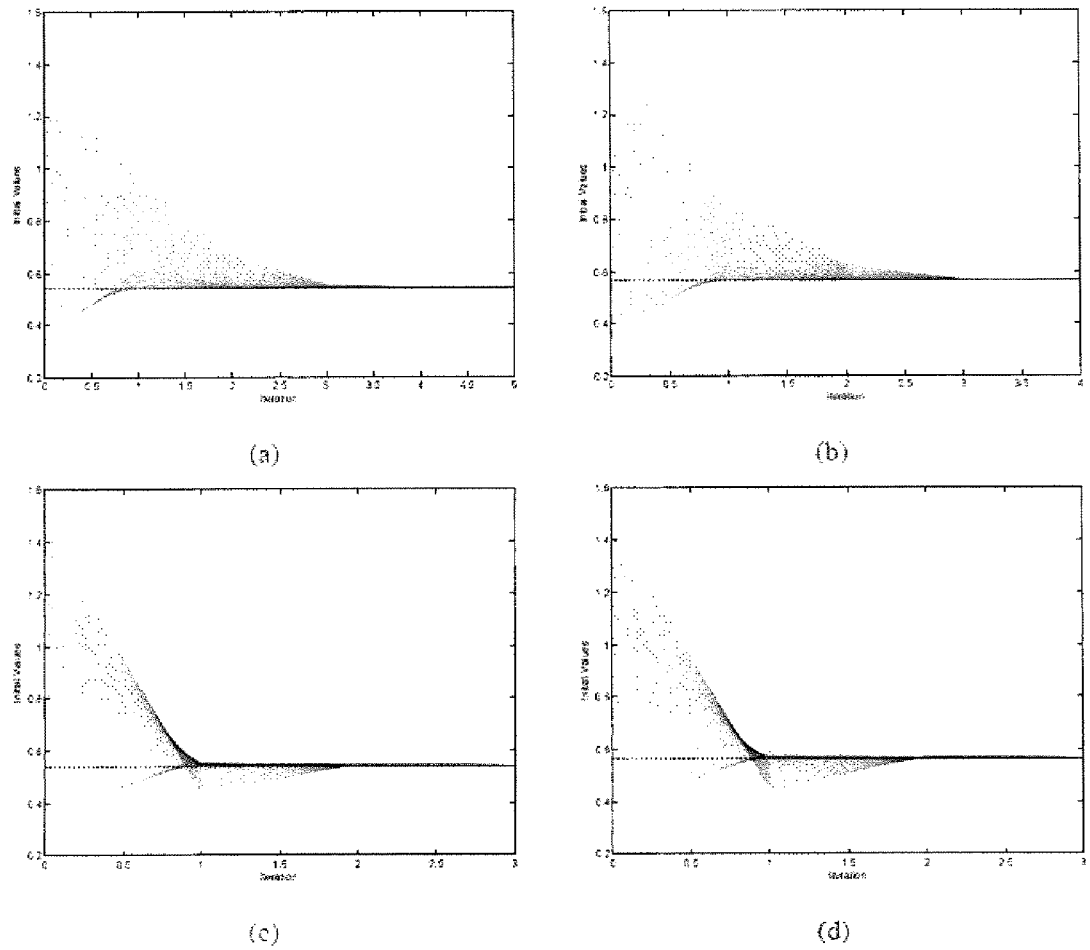
FIG. 9 illustrates an exemplary trajectory of the shape estimates plotted as a function of the iteration number for different initial values, where (a) and (b) represent trajectories of algorithm (15) for $C_{10}$ and $C_{01}$, respectively, and where (c) and (d) represent trajectories of algorithm (14) for $C_{10}$ and $C_{01}$, respectively, according to an exemplary embodiment of the invention.

To see how these algorithms actually work in practice for characterizing distributions of DCT coefficients of images, we apply both algorithms to the analysis of 512×512 grayscale Lenna image, We choose $\lambda_0=1.5$ in our image analysis. FIG. 9 shows that all iterations for the coefficient $C_{10}$ converge to the value $\hat{\beta}_n=0.5415$ and their trajectories are plotted in (a) and (c) of FIG. 9 corresponding to equations (15) and (14), respectively; it also shows that all iterations for the coefficient $C_{01}$ converge to $\hat{\beta}_n=0.5659$ and their trajectories are plotted in (b) and (d) of FIG. 9 corresponding to equations (15) and (14), respectively. These results demonstrate the global convergence of our algorithms in real image analysis. Both algorithms perform very well with algorithm (14) a couple of iterations faster than equation (15).

iii. SISE Method with Unknown Index Shape Parameter

Although the previously discussed scale-shape model with the index shape parameter known or chosen as a tuning parameter provides a flexible model that is certainly useful in some applications, it is generally reasonable to expect that the three-parameter generalized gamma distribution model fits any given data in many applications better than the scale-shape generalized gamma distribution model because the extra unknown index shape parameter provides additional degree of freedom and flexibility. The only potential challenge is how mathematically tractable the general three-parameter generalized gamma distribution model is. Even though FIG. 7 demonstrates that the shape equation (2) has a unique global root at the true shape parameter $\beta_0$, to precisely characterize its global shape for all $\lambda_0>0$ and all $\beta_0>0$ on the positive real line is, if possible at all, a monumental task because it requires establishing extremely tight inequalities for digamma and trigamma functions. Fortunately, we do not need to characterize the global shape of equations (2) and (3) on the whole positive real line, it is sufficient for our root-finding purpose to determine the global shape on the semi-infinite interval $B_\delta^+:=(\beta_0-\delta,\infty)$ for some real number $\delta>0$. Since a goal in accordance with an embodiment of the invention is to develop fast and globally convergent algorithms for finding a root that is consistent for estimating $\beta_0$, all we need is to search all possible $\beta \geq \beta_0$ for a root. If equations (2) and (3) behave nicely on the semi-infinite interval $B_\delta^+$, then such root would be the unique global root on $B_\delta^+$ and consistent for estimating $\beta_0$. To see that this is indeed the case, we express $S(\beta)$ in terms of $x:=\beta\beta_0^{-1}$ as follows:

$$S(\beta)=\log(\Gamma(\lambda_0+2x)\Gamma(\lambda_0))-2\log\Gamma(\lambda_0+x)-\log[1+x(\psi_0(\lambda_0+x)-\psi_0(\lambda_0))].$$

The expression for $\dot{S}(\beta)$ is given in equation (18). Since $\beta \geq \beta_0$ is equivalent to $x \geq 1$, we plot $S(\epsilon)$ and $\dot{S}(\beta)\beta_0$ as functions of $x$ over the interval $[1, 1001]$ for a sequence of $\lambda_0$, ranging from 0.1 to 50. These graphs are shown in FIG. 10, (a) and (b), respectively. The global monotonicity of S on $B_\delta^+$ is clearly illustrated by FIG. 10 in view of the positivity of the first derivative. These discussions lead to Theorems 5 and 6.

Theorem 5: Both equations (2) and (3) have a unique global root on the semi-infinite interval $B_\delta^+$ at the true parameter value $\beta_0$.

Proof: For simplicity of proof, we define the higher-order derivatives of $M_0(t)$ with respect to $t$ by $M_0^{(i)}$ and define the mappings $R_0^{(i)}:=M_0^{(i)}/M_0$ for $i \geq 2$. Evaluating the derivative of $S(\beta)$, we obtain $$\dot{S}(\beta) = 2(\dot{R}_0(2\beta) - \dot{R}_0(\beta)) - \frac{\dot{R}_0(\beta) - \dot{R}_0(0) + \beta(R_0^{(2)}(\beta) - \dot{R}_0^2(\beta))}{\beta(\dot{R}_0(\beta) - \dot{R}_0(0)) + 1} \quad (17)$$

For any $t>0$, it follows from (4) that $\dot{R}_0(t)=\log(\sigma_0)+\beta_0^{-1}\psi_0(\lambda_0+t\beta_0^{-1})$. Thus $\dot{R}_0(2\beta)-\dot{R}_0(\beta)=\beta_0^{-1}(\psi_0(\lambda_0+2\beta\beta_0^{-1})-\psi_0(\lambda_0+\beta\beta_0^{-1}))$ and $\dot{R}_0(\beta)-\dot{R}(0)=\beta_0^{-1}(\psi_0(\lambda_0+\beta\beta_0^{-1})-\psi_0(\lambda_0))$. Evaluating the second derivative of $M_0(t)$ and using the definition of $R_0^{(2)}(t)$ show that $R_0^{(2)}(t)=(\log(\sigma_0)+\beta_0^{-1}\psi_0(\lambda_0+t\beta_0^{-1}))^2+\beta_0^{-2}\psi_1(\lambda_0+t\beta_0^{-1})$, hence we have $R_0^{(2)}(\beta)-\dot{R}_0^2(\beta)=\beta_0^{-2}\psi_1(\lambda_0+\beta\beta_0^{-1})$. With these expressions and $x:=\beta\beta_0^{-1}$, algorithm (17) simplifies to $$\dot{S}(\beta)\beta_0 = \quad (18)$$
$$2(\psi_0(\lambda_0+2x)-\psi_0(\lambda_0+x)) - \frac{\psi_0(\lambda_0+x)-\psi_0(\lambda_0)+x\psi_1(\lambda_0+x)}{x(\psi_0(\lambda_0+x)-\psi_0(\lambda_0))+1}.$$

By the recurrence relation $\psi_0(x+1)=\psi_0(x)+1/x$, we obtain $\dot{S}(\beta_0)\beta_0=(1-\lambda_0\psi_1(\lambda_0+1))/(\lambda_0+1)$. It follows from inequality (16) that, for any $\lambda_0>0$, $$1-\lambda_0\psi_1(\lambda_0+1) > \frac{3\lambda_0^2+8\lambda_0+6}{6(\lambda_0+1)^3} > 0 \quad (19)$$

Thus $\dot{S}(\beta_0)>0$. Since $\dot{S}(\beta)$ is a continuous function of $\beta$, there exists a real number $\delta>0$ such that $\dot{S}(\beta)>0$ for all $\beta\in(\beta_0-\delta,\beta_0+\delta)$. This implies that $S(\beta)$ is strictly increasing in the neighborhood of $\beta_0$. The remainder of the proof is provided in Appendix A.1.

According to an embodiment of the invention, Theorem 5 has demonstrated the existence of a unique global root for the SISE equations (2) and (3), Analogous results for the sample SISE equations (5) and (6) are established in Theorem 6.

Theorem 6: The probability that equations (5) and (6) have a unique global root $\hat{\beta}_n$ in $B_{\delta,L}:B_\delta^+ \cap B_L$ tends to 1 as $n \to \infty$. Furthermore, $$\hat{\beta}_n \xrightarrow{P_0} \beta_0$$

as $n \to \infty$.

Proof: Let $U_n(\beta):=nM_n(2\beta)-n[1+\beta(\dot{R}_n(\beta)-\dot{R}_n(0))]M_n^2(\beta)$. Define the higher-order derivatives of $M_n(t)$ with respect to $t$ by $M_n^{(t)}(t)$ and let $R_n^{(t)}(t):=M_n^{(t)}(t)/M_n(t)$ for $i \geq 2$. Then differentiating $U_n(\beta)$ leads to $$\dot{U}_n(\beta)=2n\dot{M}_n(2\beta)-2n[1+\beta(\dot{R}_n(\beta)-\dot{R}_n(0))]M_n(\beta)$$
$$\dot{M}_n(\beta)-n[\dot{R}_n(\beta)-\dot{R}_n(0)+\beta(R_n^{(2)}(\beta)-\dot{R}_n^2(\beta))]M_n^2(\beta)$$

For every $\beta>0$, as $n \to \infty$, the LLN and CMT imply $$\dot{U}_n(\beta)/n \xrightarrow{P_0} \dot{U}(\beta),$$

where $$\dot{U}(\beta):=2\dot{M}_0(2\beta)-2[1+\beta(\dot{R}_0(\beta)-\dot{R}_0(0))]M_0(\beta)\dot{M}_0(\beta)-[\dot{R}_0(\beta)-(\beta)-\dot{R}_0(0)+\beta(R_0^{(2)}(\beta)-\dot{R}_0^2(\beta))]M_0^2(\beta).$$

Lengthy evaluation of $\dot{U}(\beta)$ at the true parameter value leads to $$\dot{U}(\beta_0) = \frac{\lambda_0}{\beta_0}\sigma_0^{2\beta_0}(1-\lambda_0\psi_1(\lambda_0+1)).$$

An application of the inequality (19) concludes that $\dot{U}(\beta_0)>0$. Repeating the same argument as in the proof of Theorem 2, we conclude that, with probability tending to 1, $\dot{S}_n(\beta)>0$ on $B_{\delta,L}$. Consequently the root $\hat{\beta}_n$ is the unique global root on $B_{\delta,L}$.

Once the estimator $\hat{\beta}_n$ is available, it follows from (1) that the estimators of $\sigma_0$ and $\lambda_0$ are given, respectively, by $$\hat{\sigma}_n = \left(\frac{M_n(\hat{\beta})}{\hat{\lambda}_n}\right)^{1/\hat{\beta}_n} \text{ and } \hat{\lambda}_n = (\hat{\beta}_n(\dot{R}_n(\hat{\beta}_n)-\dot{R}_n(0)))^{-1}.$$

An immediate consequence of Theorem 6 is stated in the following corollary.

Corollary 2: Both $\hat{\sigma}_n$ and $\hat{\lambda}_n$ are consistent for estimating $\sigma_0$ and $\lambda_0$, respectively.

Proof: It follows from the same argument as that given in Corollary 1.

To compute the root of equations (5) and (6), we use the same NR root-finding algorithms as given in (14) and (15) with the understanding that $S_n$ and $T_n$ are now defined by (5) and (6), respectively, with corresponding derivatives $\dot{S}_n$ and $\dot{T}_n$. As we have shown that $\dot{S}(\beta)>0$ on the semi-positive interval $\beta_\delta^+$, this implies that $S(\beta)$ is strictly increasing. In addition to its global monotonicity, it will be appreciated that the function S(β) is even globally convex. To illustrate this global convexity, we compute the second derivative $s^{(2)}(\beta)$. With $x:=\beta\beta_0^{-1}$, we obtain $$S^{(2)}(\beta)\beta_0^2 = \frac{\Delta_2(x)}{[x(\psi_0(\lambda_0 + x) - \psi_0(\lambda_0)) + 1]^2}, \text{ where} \quad (20)$$

$$\Delta_2(x) := 2[2\psi_1(\lambda_0 + 2x) - \psi_1(\lambda_0 + x)][x(\psi_0(\lambda_0 + x) - \psi_0(\lambda_0)) + 1]^2 - [ \quad (21)$$
$$2\psi_1(\lambda_0 + x) + x\psi_2(\lambda_0 + x)][x(\psi_0(\lambda_0 + x) - \psi_0(\lambda_0)) + 1] +$$
$$[\psi_0(\lambda_0 + x) - \psi_0(\lambda_0) + x\psi_1(\lambda_0 + x)]^2.$$

We plot $\Delta_2(x)$ versus x in FIG. 11 from which the global convexity of S(β) can be seen and verified graphically by noting that $S^{(2)}(\beta)$ has the same sign as $\Delta_2(x)$ and $\Delta_2(x)>0$. This convexity allows us to establish the following global convergence theorem.

Theorem 7: With probability tending to 1 as n→∞, algorithms (14) and (15) converge to the unique global root $\hat{\beta}_n$ from any initial value $\hat{\beta}_{n,1}$ on the semi-infinite interval $B_\delta^{30}$. In other words, $$P_0\left(\lim_{k\to\infty} \hat{\beta}_{n,k} = \hat{\beta}_n\right) \to 1 \text{ as } n \to \infty.$$

Proof: It follows from (20) and the recurrence formula $\psi_1(x+1)=\psi_1(x)-1/x^2$ that $$S^{(2)}(\beta_0)\beta_0^2 =$$

$$\frac{(4\lambda_0 + 2)\psi_1(\lambda_0 + 2)}{(\lambda_0 + 1)^2} - \frac{3\lambda_0^2 + 2\lambda_0 + 1}{(\lambda_0 + 1)^4} + \frac{\lambda_0^2 \psi_1^2(\lambda_0 + 1)}{(\lambda_0 + 1)^2} - \frac{\lambda_0 \psi_2(\lambda_0 + 1)}{\lambda_0 + 1}.$$

Applying the inequality (16), we obtain for any $\lambda_0>0$ $$\frac{(4\lambda_0 + 2)\psi_1(\lambda_0 + 2)}{(\lambda_0 + 1)^2} - \frac{3\lambda_0^2 + 2\lambda_0 + 1}{(\lambda_0 + 1)^4} >$$
$$\frac{\lambda_0(\lambda_0^2 + 2\lambda_0 + 3)}{(\lambda_0 + 1)^4(\lambda_0 + 2)} + \frac{(4\lambda_0 + 2)(15\lambda_0^3 + 95\lambda_0^2 + 200\lambda_0 + 139)}{30(\lambda_0 + 1)^2(\lambda_0 + 2)^5}.$$

This together with the negativity of $\psi_2(x)$ implies $S^{(2)}(\beta_0)>0$. Thus S is strictly convex in a neighborhood of $\beta_0$. The proof is complete by applying the same fixed-point argument as disclosed with respect to Song's shape equation, coupled with Appendix A.2.

Figure 12:
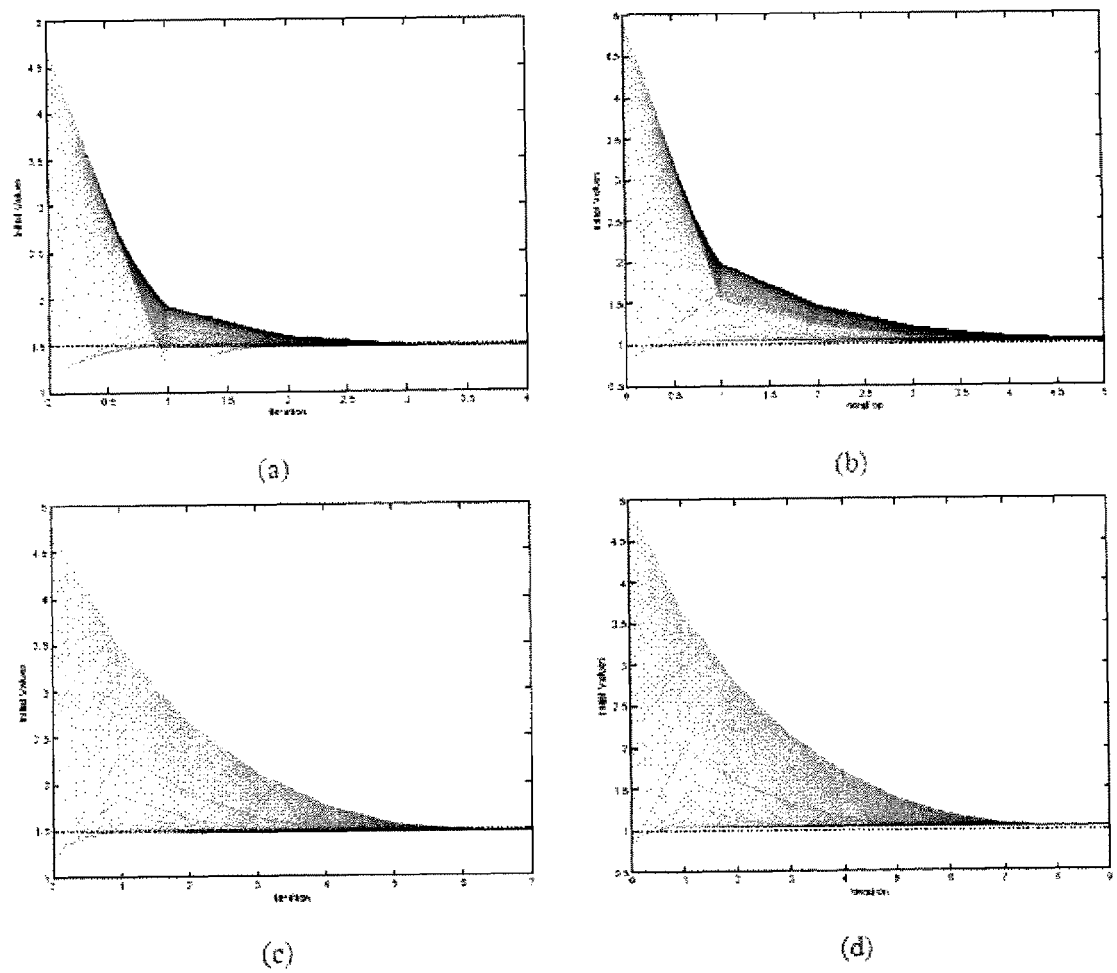
FIG. 12 illustrates an exemplary trajectory of the shape estimates plotted as a function of the iteration number for different initial values, where (a) and (b) show trajectories of algorithm (14) and (c) and (d) show trajectories of algorithm (15), according to an exemplary embodiment of the invention.

An implication of Theorem 7 is that the proposed algorithms do not require accurate initial values that are apparently difficult to obtain without any prior knowledge or some preliminary analysis of the given data set, and all upper bounds of $\beta_0$, no matter how large they are, can serve as starting values for the NR algorithms to converge given sufficiently large n. It is worth noting that although the unknown value of $\beta_0$ can be very small corresponding to heavy-tailed distributions, it is seldom very large in practical applications and the range $0<\beta_0<3$ is quite typical of many applications in image and video processing. Thus any upper bound, say, 3 or 4 can be chosen to initiate the NR algorithm. To demonstrate the global convergence of our algorithms, we carry out some Monte Carlo simulations. We apply both algorithms to a single random sample of size 300 generated from the generalized gamma distribution with $\theta_0=(1.0, 1.5, 1.0)$ and plot, for different initial values, the trajectory of the shape estimates as a function of the iteration number in (a) and (c) of FIG. 12; the same procedure is also applied to a single random sample of size 300 generated with $\theta_0=(1.0,1.0,4.0)$ and the trajectories are shown in (b) and (d) of FIG. 12. As can be seen from FIG. 12, all iterations of both algorithms converge even though the initial values are far away from the true parameter values: the converged values are $\hat{\beta}_n=1.4839$ for (a) and (c) and $\hat{\beta}_n=1.0324$ for (b) and (d) corresponding to the true values 1.5 and 1.0, respectively, Although algorithm (14) for equation (5) has similar performance as algorithm (15) for equation (6), algorithm (14) is significantly faster than algorithm (15).

In addition to the global convergence, we perform a further numerical experiment to assess the accuracy of algorithm (14) for various sample sizes ranging from 100 to 300 and for different combinations of parameter values. The resulting estimates are then used to initiate the NR algorithm for computing the ML estimates. These results are presented in FIG. 13. We see from FIG. 13 that SISE estimates are quite close to ML estimates and the accuracy of both SISE and ML estimates increases as sample size increases. Given that all estimates are obtained from a single random sample, they are fairly accurate for all sample sizes greater than 100.

To verify the fast global convergence of our algorithms for image processing, we analyze several well-known 512×512 images, including Lenna, Elaine, Bridge, and Boat. We apply the symmetrized generalized gamma distribution $f_s$ to model the DCT coefficients of these test images, as illustrated in the left panel of FIG. 14. However, it is worth pointing out that the same analysis given in this article can be applied to the DWT coefficients. Specifically we apply algorithm (14) to the $C_{01}$ coefficient of these images and plot, for various initial values, the trajectory of the shape estimates as a function of the iteration number in the right panel of FIG. 14. The fast global convergence of our algorithm is evident from right panel of FIG. 14: the convergence is achieved in only about two to four iterations. The fast global convergence property of our algorithms become particularly important when they are used in real-time applications in image and video processing because they can dramatically speed up the estimation process.

Having demonstrated the fast global convergence and good accuracy of our algorithms, we apply algorithm (14) to various DCT coefficients of the aforementioned test images. The resulting shape parameter estimates are again used to initiate the NR algorithm for obtaining the ML estimates. Both SISE and ML estimates are given in FIG. 15. To evaluate the variability associated with each DCT coefficient, we need to compute the standard deviation of the three-parameter generalized gamma distribution. It follows from (4) that the variance of the three-parameter generalized gamma distribution is given by $$\text{var}(X) = \sigma_0^2\left(\frac{\Gamma(\lambda_0 + 2\beta_0^{-1})}{\Gamma(\lambda_0)} - \frac{\Gamma^2(\lambda_0 + \beta_0^{-1})}{\Gamma^2(\lambda_0)}\right). \quad (22)$$

By plugging SISE estimator $\hat{\theta}_n$ and ML estimator $\tilde{\theta}_n$ into equation (22), we obtain the corresponding estimated standard deviations denoted by $\hat{s}_n$ and $\tilde{s}_n$, respectively. These estimated standard deviations are also presented in FIG. 15 from which the small difference between SISE estimates and ML estimates especially for $\beta_0$ clearly demonstrates the accuracy of SISE estimators.

C. Maximum Likelihood Ratio Procedure for Testing GGD Versus Generalized Gamma Distribution Under the null hypothesis $H_0: \lambda = 1/\beta$, the generalized gamma distribution pdf reduces to the pdf of the GGD. Thus, the GGD model is embedded in the generalized gamma distribution model and the ML ratio statistic can be used to test the goodness-of-fit between these two competing models. By comparing the maximum likelihood of the generalized gamma distribution model with that of the GGD model, the ML ratio test provides one objective criterion for selecting between a relatively more complex (full) model and a simpler (reduced) model. More specifically, let $\tilde{\theta}_{n,0}$ denote the ML estimator for $\theta_0$ under $H_0$ and $L(\theta)$ denote the log likelihood. Then the log ML ratio statistic is given by $\Lambda_n := -2(L(\tilde{\theta}_{n,0}) - L(\tilde{\theta}_n))$. Under $H_0$, $\Lambda_n$ is asymptotically chi squared-distributed with one degree of freedom. Given the sample data, a large value of the ML ratio statistic leads to the rejection of $H_0$ indicating that the generalized gamma distribution fits the particular dataset significantly better; whereas a small value favors the simpler GGD model. Evaluating $\Lambda_n$ requires the ML estimators of shape parameters under both models. To overcome the formidable challenge of computing the ML estimators, we use the SISE estimators as initial estimators to initiate the NR algorithm for finding the ML estimators. Since the SISE estimates are quite close to the ML estimates as we have seen from FIGS. 13 and 15, only one-step NR iteration would typically yield the ML estimates. The resulting values of $\Lambda_n$ for various DCT coefficients of our test images are presented in FIG. 16. We also compute the P-value corresponding to each value of $\Lambda_n$ and these P-values are reported in FIG. 16, according to an exemplary embodiment of the invention.

As can be observed from FIG. 16, the P-values for all of the DCT coefficients of Elaine and Lenna images are extremely small that the ML ratio tests provide overwhelming evidence to reject the null hypothesis $H_0$ and conclude that the three-parameter generalized gamma distribution model fits these types of images significantly better than the two-parameter GGD model; whereas for most DCT coefficients of the Bridge image, the P-values are not very small at all compared with the 0.05 significance level, thus we fail to reject $H_0$ and conclude that the two-parameter GGD model fits most DCT coefficient data for the Bridge image equally well as the three-parameter generalized gamma distribution model. By the parsimonious statistical principle, we would in practice adopt the GGD as the underlying statistical model for those DCT coefficients. Finally for the Fishing Boat image, based on its P-value, we would reject the GGD model for all DCT coefficients except $C_{10}$ and $C_{20}$. These findings indicate that for many of the DCT coefficients, the three-parameter generalized gamma distribution may provide a better model than the two-parameter GGD.

D. Appendix

A.1 Proof of Theorem 5: To show $\dot{S}(\beta) > 0$ for all $\beta \geq \beta_0$, it is sufficient to show that $$\Delta_1(x) := 2(\psi_0(\lambda_0+2x) - \psi_0(\lambda_0+x))[x(\psi_0(\lambda_0+x) - \psi_0(\lambda_0)) + 1] - \psi_0(\lambda_0+x) + \psi_0(\lambda_0) - x\psi_1(\lambda_0+x) > 0 \text{ for all } x \geq 1.$$

According to an embodiment of the invention, we provide a proof only for sufficiently large $\lambda_0$ so that the polygamma functions $\psi_0(\lambda_0)$ and $\psi_1(\lambda_0)$ can be approximated by $\log \lambda_0$ and $1/\lambda_0$, respectively, with small enough errors:

$$\Delta_1(x) \approx 2\log\frac{\lambda_0+2x}{\lambda_0+x}\left(x\log\frac{\lambda_0+x}{\lambda_0}+1\right) - \log\frac{\lambda_0+x}{\lambda_0} - \frac{x}{\lambda_0+x}.$$

Using the inequality $1 - x^{-1} < \log x < x - 1$ valid for all $x > 0$, we obtain $$2\log\frac{\lambda_0+2x}{\lambda_0+x} > \frac{x(2\lambda_0+3x)}{(\lambda_0+2x)^2} \text{ and } -\log\frac{\lambda_0+x}{\lambda_0} - \frac{x}{\lambda_0+x} >$$

$$-\frac{x(2\lambda_0+x)}{\lambda_0(\lambda_0+x)}. \text{ Therefore } 2\log\frac{\lambda_0+2x}{\lambda_0+x} - \log\frac{\lambda_0+x}{\lambda_0} - \frac{x}{\lambda_0+x} >$$

$$-\frac{x[2\lambda_0^2(\lambda_0-1) + 5\lambda_0 x(\lambda_0-1) + x^2(3\lambda_0-2)]}{\lambda_0(\lambda_0+x)(\lambda_0+2x)^2} > 0.$$

This coupled with the fact that $2x \log[(\lambda_0+2x)/(\lambda_0+x)] \log[(\lambda_0+x)/\lambda_0] > 0$ completes the proof.

A.2 Proof of Theorem 7: It suffices to show that $\Delta_2(x) > 0$. We have $$\Delta_2(x) \approx \left\{\frac{2\lambda_0}{(\lambda_0+2x)(\lambda_0+x)}\left[x\log\frac{\lambda_0+x}{\lambda_0}+1\right] - \frac{2\lambda_0+x}{(\lambda_0+x)^2}\right\}\left[x\log\frac{\lambda_0+x}{\lambda_0}+1\right] + \left[\log\frac{\lambda_0+x}{\lambda_0} + \frac{x}{\lambda_0+x}\right]^2.$$

By the same inequality as given in A.1, $x \log[(\lambda_0+x)/\lambda_0] + 1 > (x^2 + x + \lambda_0)/\lambda_0 + x)$.

Consequently $$\frac{2\lambda_0}{(\lambda_0+2x)(\lambda_0+x)}\left[x\log\frac{\lambda_0+x}{\lambda_0}+1\right] - \frac{2\lambda_0+x}{(\lambda_0+x)^2} > \frac{2(\lambda_0-1)x^2 - 3\lambda_0 x}{(\lambda_0+2x)(\lambda_0+x)^2}.$$

We conclude that $$\Delta_2(x) \geq \frac{2(\lambda_0-1)x^2 - 3\lambda_0 x}{(\lambda_0+2x)(\lambda_0+x)^2}\left[x\log\frac{\lambda_0+x}{\lambda_0}+1\right] + \left[\log\frac{\lambda_0+x}{\lambda_0} + \frac{x}{\lambda_0+x}\right]^2.$$

Similarly it follows from $x \log[(\lambda_0+x)/\lambda_0] + 1 < (x^2 + \lambda_0)/\lambda_0$ that $$-\frac{3\lambda_0 x}{(\lambda_0+2x)(\lambda_0+x)^2}\left[x\log\frac{\lambda_0+x}{\lambda_0}+1\right] > -\frac{3x(x^2+\lambda_0)}{(\lambda_0+2x)(\lambda_0+x^2)}.$$

In addition, it follows from $[\log((\lambda_0+x)/\lambda_0) + x/(\lambda_0+x)]^2 > 4x^2/(\lambda_0+x)^2$ that $$\left[\log\frac{\lambda_0+x}{\lambda_0} + \frac{x}{\lambda_0+x}\right]^2 - \frac{3\lambda_0 x}{(\lambda_0+2x)(\lambda_0+x)^2}\left[x\log\frac{\lambda_0+x}{\lambda_0}+1\right] >$$

$$\frac{5x^3 + x\lambda_0(4x-3)}{(\lambda_0+2x)(\lambda_0+x)^2}. \text{ Hence}$$

$$\Delta_2(x) \geq \frac{2(\lambda_0-1)x^2}{(\lambda_0+2x)(\lambda_0+x)^2}\left[x\log\frac{\lambda_0+x}{\lambda_0}+1\right] + \frac{5x^3 + x\lambda_0(4x-3)}{(\lambda_0+2x)(\lambda_0+x)^2} >$$

$$0 \text{ for all } x \geq 1.$$

The same argument can be applied to the analysis of T(β).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method of signal processing, comprising:
    receiving a plurality of digitized coefficients;
    determining a best-fit distribution of a general family of distributions for the plurality of digitized coefficients, the general family of distributions comprising a generalized gamma distribution having at least a first shape parameter, wherein the first shape parameter for the best-fit distribution is determined by obtaining, via one or more iterations, a global root value of a shape estimator equation that utilizes the plurality of digitized coefficients, wherein the iterations are globally-convergent to the global root value irrespective of a starting value of the first shape parameter, the global root value being the first shape parameter of the best-fit distribution; and
    providing a characterization of the digitized coefficients based upon the determined best-fit distribution,
    wherein the shape estimator equation is provided by one of (i) $S_n(\beta) :=$
$$\log(M_n(2\beta)) - 2\log(M_n(\beta)) - \log\left(1 + \beta(\dot{R}_n(\beta) - \dot{R}_n(0))\right) = 0 \text{ and}$$

(ii) $T_n(\beta) := \frac{M_n(2\beta)}{M_n^2(\beta)} - \left(1 + \beta(\dot{R}_n(\beta) - \dot{R}_n(0))\right) = 0,$ (iii) $S_n(\beta) := \log(M_n(2\beta)) - 2\log(M_n(\beta)) - \log\left(1 + \frac{1}{\lambda_0}\right) = 0,$ and (iv) $T_n(\beta) := \frac{M_n(2\beta)}{M_n^2(\beta)} - \left(1 + \frac{1}{\lambda_0}\right) = 0,$ wherein $M_n : t \mapsto \frac{1}{n}\sum_{i=1}^{n} |X_i|^t$, $X_1 \ldots X_n$ are the digitized coefficients, $\dot{R}_n := \frac{\dot{M}_n}{M_n}, \dot{M}_n$ denotes a derivative of $M_n$ with respect to t, and $\lambda_0$ is a known value of an index shape parameter,
wherein the prior steps are performed by one or more computers.

2. The computer-implemented method of claim 1, wherein obtaining the root value includes applying Newton-Rapson iterations or Halley's method to the shape estimator equation.

3. The computer-implemented method of claim 1, wherein the plurality of digitized coefficients are associated with an image and the characterization includes quantizers determined based upon the determined best-fit distribution, wherein the quantizers are associated with a compressed representation of the digitized coefficients.

4. The computer-implemented method of claim 1, wherein the digitized coefficients are associated with sensing data of a sensing module and wherein the characterization includes a determination of whether an event of interest (i) has occurred or (ii) is likely to occur.

5. The computer-implemented method of claim 4, wherein providing a characterization includes the sensing module notifying a control unit whenever an event of interest has occurred or is likely to occur.

6. The computer-implemented method of claim 4, wherein the event of interest is associated with at least one of (i) radiation levels, (ii) weather conditions, and (iii) person, object, or voice identification.

7. The computer-implemented method of claim 1, wherein the plurality of digitized coefficients are associated with ultrasound speckles and the characterization includes at least one of (i) a filter for the ultrasound speckles, and (ii) a diagnosis of a medical condition.

8. A system for signal processing, comprising:
    a memory for storing computer program instructions;
    a processor in communication with the memory, wherein the processor is operable to execute the computer program instructions to:
    receive a plurality of digitized coefficients;
    determine a best-fit distribution of a general family of distributions for the plurality of digitized coefficients, the general family of distributions comprising a generalized gamma distribution having at least a first shape parameter, wherein the first shape parameter for the best-fit distribution is determined by obtaining, via one or more iterations, a global root value of a shape estimator equation that utilizes the plurality of digitized coefficients, wherein the iterations are globally-convergent to the global root value irrespective of a starting value of the first shape parameter, the global root value being the first shape parameter of the best-fit distribution; and
    provide a characterization of the digitized coefficients based upon the determined best-fit distribution,.
    wherein the shave estimator equation is provided by one of (i) $S_n(\beta) :=$
$$\log(M_n(2\beta)) - 2\log(M_n(\beta)) - \log\left(1 + \beta(\dot{R}_n(\beta) - \dot{R}_n(0))\right) = 0 \text{ and}$$

(ii) $T_n(\beta) := \frac{M_n(2\beta)}{M_n^2(\beta)} - \left(1 + \beta(\dot{R}_n(\beta) - \dot{R}_n(0))\right) = 0,$ (iii) $S_n(\beta) := \log(M_n(2\beta)) - 2\log(M_n(\beta)) - \log\left(1 + \frac{1}{\lambda_0}\right) = 0,$ and (iv) $T_n(\beta) := \frac{M_n(2\beta)}{M_n^2(\beta)} - \left(1 + \frac{1}{\lambda_0}\right) = 0,$ wherein $M_n : t \mapsto \frac{1}{n}\sum_{i=1}^{n} |X_i|^t$, $X_1 \ldots X_n$ are the digitized coefficients, $\dot{R}_n := \frac{\dot{M}_n}{M_n}, \dot{M}_n$ denotes a derivative of $M_n$ with respect to t, and $\lambda_0$ is a known value of an index shape parameter.

9. The system of claim 8, wherein the root value is obtained by applying Newton-Rapson iterations or Halley's method to the shape estimator equation.

10. The system of claim 8, wherein the plurality of digitized coefficients are associated with an image and the characterization includes quantizers determined based upon the determined best-fit distribution, wherein the quantizers are associated with a compressed representation of the digitized coefficients.

11. The system of claim 8, wherein the digitized coefficients are associated with sensing data of a sensing module and wherein the characterization includes a determination of whether an event of interest (i) has occurred or (ii) is likely to occur.

12. The system of claim 11, wherein the processor is operable to execute the computer program instructions to provide the characterization by notifying a control unit whenever an event of interest has occurred or is likely to occur.

13. The system of claim 11, wherein the event of interest is associated with at least one of (i) radiation levels, (ii) weather conditions, and (iii) person, object, or voice identification.

14. The system of claim 8, wherein the plurality of digitized coefficients are associated with ultrasound speckles and the characterization includes at least one of (i) a filter for the ultrasound speckles, and (ii) a diagnosis of a medical condition.

15. The computer-implemented method of claim 1, wherein the generalized gamma distribution further includes a second shape parameter and a scale parameter, wherein the second shape parameter and the scale parameter are derived based upon the determined first shape parameter.

16. The computer-implemented method of claim 1, wherein the shape estimator equation is scale-invariant and is independent of a scale parameter associated with the generalized gamma distribution.

17. The system of claim 8, wherein the generalized gamma distribution further includes a second shape parameter and a scale parameter, wherein the second shape parameter and the scale parameter are derived based upon the determined first shape parameter.

18. The system of claim 8, wherein the shape estimator equation is scale-invariant and is independent of a scale parameter associated with the generalized gamma distribution.

* * * * *